US012652651B2

(12) United States Patent
Lee et al.

(10) Patent No.: US 12,652,651 B2
(45) Date of Patent: Jun. 9, 2026

(54) NR SL PSFCH TRANSMISSION AND MONITORING

(71) Applicant: InterDigital Patent Holdings, Inc., Wilmington, DE (US)

(72) Inventors: Moon-il Lee, Melville, NY (US); Tao Deng, Roslyn, NY (US); Tuong Duc Hoang, Montreal (CA); Chunxuan Ye, San Diego, CA (US); Martino Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 550 days.

(21) Appl. No.: 17/601,979

(22) PCT Filed: Apr. 8, 2020

(86) PCT No.: PCT/US2020/027232
§ 371 (c)(1),
(2) Date: Oct. 7, 2021

(87) PCT Pub. No.: WO2020/210333
PCT Pub. Date: Oct. 15, 2020

(65) Prior Publication Data
US 2022/0201654 A1 Jun. 23, 2022

Related U.S. Application Data

(60) Provisional application No. 62/831,320, filed on Apr. 9, 2019, provisional application No. 62/885,926, filed
(Continued)

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1812* (2013.01); *H04L 5/0053* (2013.01); *H04W 72/0446* (2013.01); *H04W 72/20* (2023.01)

(58) Field of Classification Search
CPC . H04W 72/02; H04W 72/0446; H04W 72/20; H04L 1/1812; H04L 5/0053; H04L 5/0055; H04L 1/1861; H04L 1/1864
See application file for complete search history.

(56) References Cited

U.S. PATENT DOCUMENTS

2017/0048829 A1 2/2017 Kim et al.
2019/0052436 A1 2/2019 Desai et al.
(Continued)

FOREIGN PATENT DOCUMENTS

WO WO 2017-083388 A1 5/2017

OTHER PUBLICATIONS

Vivo 3GPP TSG RAN WG1 Ad-Hoc Meeting 1901 Taipei, Jan. 21-25, 2019 (Year: 2019).*
(Continued)

*Primary Examiner* — Alison Slater
(74) *Attorney, Agent, or Firm* — Condo Roccia Koptiw LLP

(57) ABSTRACT

Hybrid automatic repeat request (HARQ) timing may be determined. Physical SL feedback channel (PSFCH) resource pool selection may be performed. A source WTRU may (e.g., determine to) signal a PSFCH resource based on channel state information (CSI), transmitter (TX)-receiver (RX) distance, and/or CBR. A destination WTRU may determine sub-channels to include PSFCH resources based on a PSCCH/PSSCH resource and/or WTRU PHY ID information. One or more resource blocks may be determined within a sub-channel for PSFCH transmission based on the WTRU PHY ID and/or a Link ID. A first set of
(Continued)

🔲 PSCCH   🔲 PSSCH   ■ PSFCH   🔲 Tx/Rx switch symbols in a slot may be sensed to detect a PSSCH and/or a PSSCH+PSFCH transmission to (e.g., determine to) transmit a PSFCH in the end of the slot without colliding with the PSSCH. A WTRU may switch to a dedicated PSFCH resource pool or Mode 1 transmission upon failure to acquire PSFCH resources in a shared PSFCH resource pool.

13 Claims, 11 Drawing Sheets

Related U.S. Application Data on Aug. 13, 2019, provisional application No. 62/908,655, filed on Oct. 1, 2019, provisional application No. 62/910,547, filed on Oct. 4, 2019, provisional application No. 62/930,825, filed on Nov. 5, 2019.

(51) Int. Cl.
*H04L 5/00* (2006.01)
*H04W 72/0446* (2023.01)
*H04W 72/20* (2023.01)

(56) References Cited

U.S. PATENT DOCUMENTS

| | | | | |
|---|---|---|---|---|
| 2020/0029318 | A1* | 1/2020 | Guo | H04W 4/40 |
| 2020/0106566 | A1* | 4/2020 | Yeo | H04W 28/04 |
| 2020/0220669 | A1* | 7/2020 | Park | H04L 1/1896 |
| 2020/0228247 | A1* | 7/2020 | Guo | H04L 5/0048 |
| 2020/0305126 | A1* | 9/2020 | Li | H04L 1/1614 |
| 2020/0313743 | A1* | 10/2020 | Park | H04L 5/0048 |
| 2021/0112544 | A1* | 4/2021 | Chen | H04W 52/242 |
| 2021/0218511 | A1* | 7/2021 | Zhang | H04L 5/0048 |

OTHER PUBLICATIONS

3rd Generation Partnership Project (3GPP), 3GPP_R1-1813554, "Design and contents of PSCCH and PSFCH", Huawei, HiSilicon, Spokane, USA, Nov. 12-16, 2018, 7 pages.

3rd Generation Partnership Project (3GPP), 3GPP RP-190225, "Study on Nr V2X", Shenzhen, China, Mar. 18-21, 2019, 29 pages.

3rd Generation Partnership Project (3GPP), 3GPP TR 37.885 V1.0.0, "Study on evaluation methodology of new Vehicle-to-Everything (V2X) use cases for LTE and NR", May 2018, 35 pages.

3rd Generation Partnership Project (3GPP), 3GPP TR 38.913, "Technical Specification Group Radio Access Network; Study on Scenarios and Requirements for Next Generation Access Technologies", V14.1.0, Dec. 2016, 38 pages.

3rd Generation Partnership Project (3GPP), R1-1904920, "Physical Layer Procedure for NR-V2X Sidelink", OPPO, 3GPP TSG RAN WG1 #96bis Xi'an, China, Apr. 8-12, 2019, 8 pages.

3rd Generation Partnership Project (3GPP), R1-1904689, "Design and contents of PSCCH and Psfch", 3GPP Tsg Ran WG1 Meeting #96bis; Huawei, HiSilicon; Xi'an, China, Apr. 8-12, 2019, 9 pages.

3rd Generation Partnership Project (3GPP), R1-1905101, "Physical layer procedure for Nr V2X", 3GPP Tsg Ran WG1 #96bis; ITL; Xi'an, China, Apr. 8-12, 2019, 4 pages.

3rd Generation Partnership Project (3GPP), R1-1905356, "Discussion on physical layer procedures for sidelink in Nr V2X", 3GPP Tsg Ran WG1 Meeting #96bis; CATT; Xi'an, China, Apr. 8-12, 2019, 4 pages.

3rd Generation Partnership Project (3GPP), R1-1905400, "On Physical Layer Structure for Nr V2X Sidelink", 3GPP Tsg Ran WG1 #96bis; InterDigital Inc .; Xi'an, China, Apr. 8-12, 2019, 15 pages.

3rd Generation Partnership Project (3GPP), R1-1905425, "Nr Sidelink Physical Layer Procedure", 3GPP Tsg Ran WG1 #96bis; Ntt Docomo, Inc .; Xi'an, China, Apr. 8-12, 2019, 8 pages.

* cited by examiner

NR SL PSFCH TRANSMISSION AND MONITORING

CROSS-REFERENCE TO RELATED APPLICATIONS

This application is the National Stage Entry under 35 U.S.C. § 371 of Patent Cooperation Treaty Application No. PCT/US2020/027232, filed Apr. 8, 2020, which claims the benefit of U.S. Provisional Application No. 62/831,320, filed Apr. 9, 2019; U.S. Provisional Application No. 62/885,926, filed Aug. 13, 2019; U.S. Provisional Application No. 62/908,655, filed Oct. 1, 2019; U.S. Provisional Application No. 62/910,547, filed Oct. 4, 2019; and U.S. Provisional Application No. 62/930,825, filed Nov. 5, 2019, the contents of which are incorporated by reference herein.

BACKGROUND

Mobile communications using wireless communication continue to evolve. A fifth generation may be referred to as 5G. A previous (e.g., legacy) generation of mobile communication may be, for example, fourth generation (4G) long term evolution (LTE).

SUMMARY

Hybrid automatic repeat request (HARQ) timing may be determined based on, for example, wireless transmit/receive unit (WTRU) capability, subcarrier spacing, transport block (TB) priority information, and/or a channel busy ratio (CBR). Physical side link (SL) feedback channel (PSFCH) resource pool selection may be performed, for example, based on quality of service (QoS) requirements and/or a CBR. A WTRU may determine a PSFCH time and frequency resource. A source WTRU may (e.g., determine to) signal a PSFCH resource based on, for example, channel state information (CSI), transmitter (TX)-receiver (RX) distance, and/or a CBR. A destination WTRU may determine sub-channels to include PSFCH resources based on, for example, a physical SL control channel (PSCCH)/physical SL shared channel (PSSCH) resource and/or WTRU physical (PHY) identifier (ID) information. One or more resource blocks (RBs) may be determined within a sub-channel for PSFCH transmission based on, for example, the WTRU PHY ID and/or a Link ID. A first set of symbols in a slot may be sensed to detect a PSSCH and/or a PSSCH+PSFCH transmission, for example, to (e.g., determine to) transmit a PSFCH in the end of the slot without colliding with the PSSCH. A WTRU may switch to a dedicated PSFCH resource pool or Mode 1 transmission, for example, upon failure to acquire PSFCH resources in a shared PSFCH resource pool. PSSCH/PSCCH may be transmitted and received in a PSFCH slot.

A WTRU may determine a PSFCH resource based on, for example, a cast type and/or a HARQ feedback option. A WTRU may determine a frequency size of a PSFCH resource based on, for example, a bandwidth of a PSSCH. A WTRU may determine a PSFCH resource for a PSSCH/PSCCH transmission in an acknowledged/not acknowledged (ACK/NACK) based groupcast transmission. A WTRU may perform rate matching/puncturing and/or may adjust a modulation and coding scheme (MCS) for a transmission, for example, if the WTRU detects a possible collision and/or if the WTRU has to transmit PSSCH/PSCCH and transmit/receive PSFCH in the same time slot. A WTRU may determine a transmission duration of a PSSCH/PSCCH in a slot having a PSFCH resource based on, for example, a sub-channel index of the PSSCH/PSCCH transmission.

A WTRU may select a PSFCH resource from a plurality of PSFCH resources that correspond to a PSSCH transmission. An RX WTRU may select a PSFCH resource from a set of PSFCH resources associated with a (e.g., one) PSSCH transmission based on, for example, one or more of a pre-configuration, a WTRU L1 Source ID, a HARQ ID, or a PSFCH transmission configuration. A WTRU may perform PSFCH blind detection among associated PSFCH resources. A WTRU may determine a PSFCH resource for an Option 2 Groupcast transmission based on, for example, an ACK and/or a NACK. Groupcast PSFCH resource determination for an Option 2 HARQ operation (ACK/NACK-based) may be based on, for example, one or more of a WTRU L1 ID (e.g., a Source ID/randomly assigned ID), a WTRU TX-RX distance, a minimum communication range requirement, a reference signal received power (RSRP), a Zone/sub-Zone ID, a PSFCH power level, a path loss, etc.

A WTRU may determine a HARQ timing. The WTRU may determine the HARQ timing based on, for example, K and/or N values. A WTRU may use one or more N values, for example, to determine which slots include PSFCH resources. A WTRU may use one or more K values, for example, to determine a slot for a PSFCH transmission. A WTRU may send a HARQ feedback on a first slot (e.g., that includes a PSFCH resource after #n+K slots), for example, when the WTRU receives a PSSCH in slot #n. One or more K values may be used. A K value may be determined based on, for example, at least one of subcarrier spacing of the resource pool, a demodulation reference signal (DM-RS) pattern (e.g., front-loaded or front-loaded+additional DM-RS), a number of symbols for PSCCH, a QoS of the packet, or a maximum QoS of the resource pool.

A WTRU may (e.g., determine to) flush a HARQ buffer, for example, based on a (pre-) configured period. A WTRU may release a low priority HARQ process, for example, when the WTRU receives a high priority transmission and/or has no remaining HARQ transmissions/receptions for the low priority HARQ process.

A WTRU may be configured to select a PSFCH resource. A WTRU may receive or be preconfigured with an allocation of PSFCH resources. The WTRU may receive an SCI associated with a PSSCH. The WTRU may determine a set of PSFCH resources within the allocation of PSFCH resources. The WTRU may select a PSFCH resource within the set of PSFCH resources. The PSFCH resource may be a (e.g., one) resource block. The selection may be based (e.g., at least in part) on an L1 Source ID (e.g., indicated in the SCI) and a HARQ process ID (e.g., indicated in the SCI). In an example, the selection of the PSFCH resource may be (e.g., further) based on slot information and/or a group member ID. The WTRU may be (e.g., further) (pre-)configured to, for example, send HARQ ACK/NACK information associated with the PSSCH on the selected PSFCH resource. The set of PSFCH resources within the allocation of PSFCH resources may be determined, for example, based on a lowest PSSCH sub-channel index and PSSCH slot number. There may be (e.g., for the received or preconfigured PSFCH resources) a mapping between a (e.g., each) sub-channel in a PSSCH resource pool and a (e.g., one) PSFCH resource in the allocation of PSFCH resources. The received or preconfigured PSFCH resources may comprise unicast and groupcast resources. The determination of the set of PSFCH resources within the allocation of PSFCH resources may be based on a cast type. The selection of the PSFCH resource within the set of PSFCH resources may be (e.g., further) based on a cast type.

DETAILED DESCRIPTION

Figure 1A:
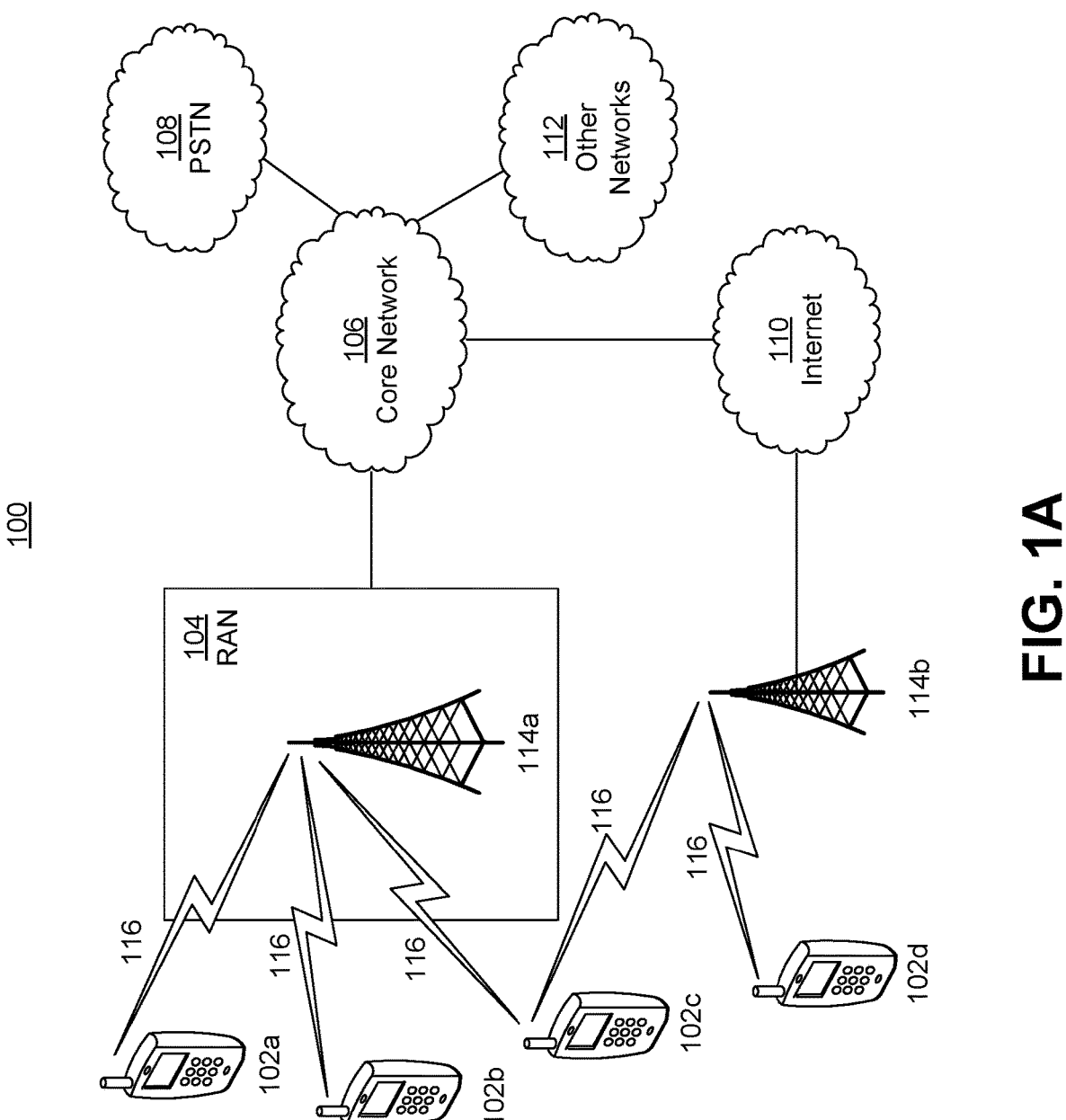
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
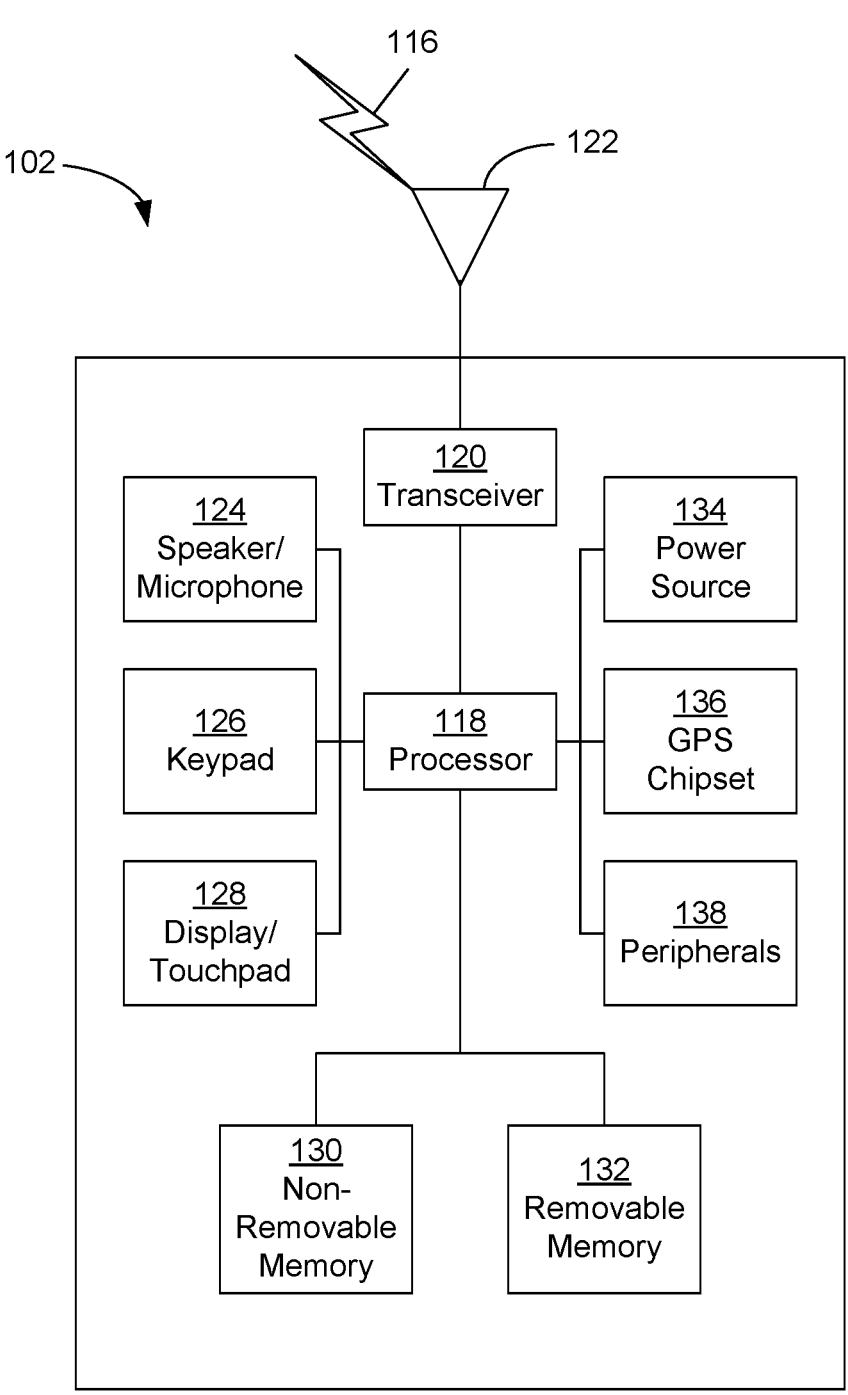
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
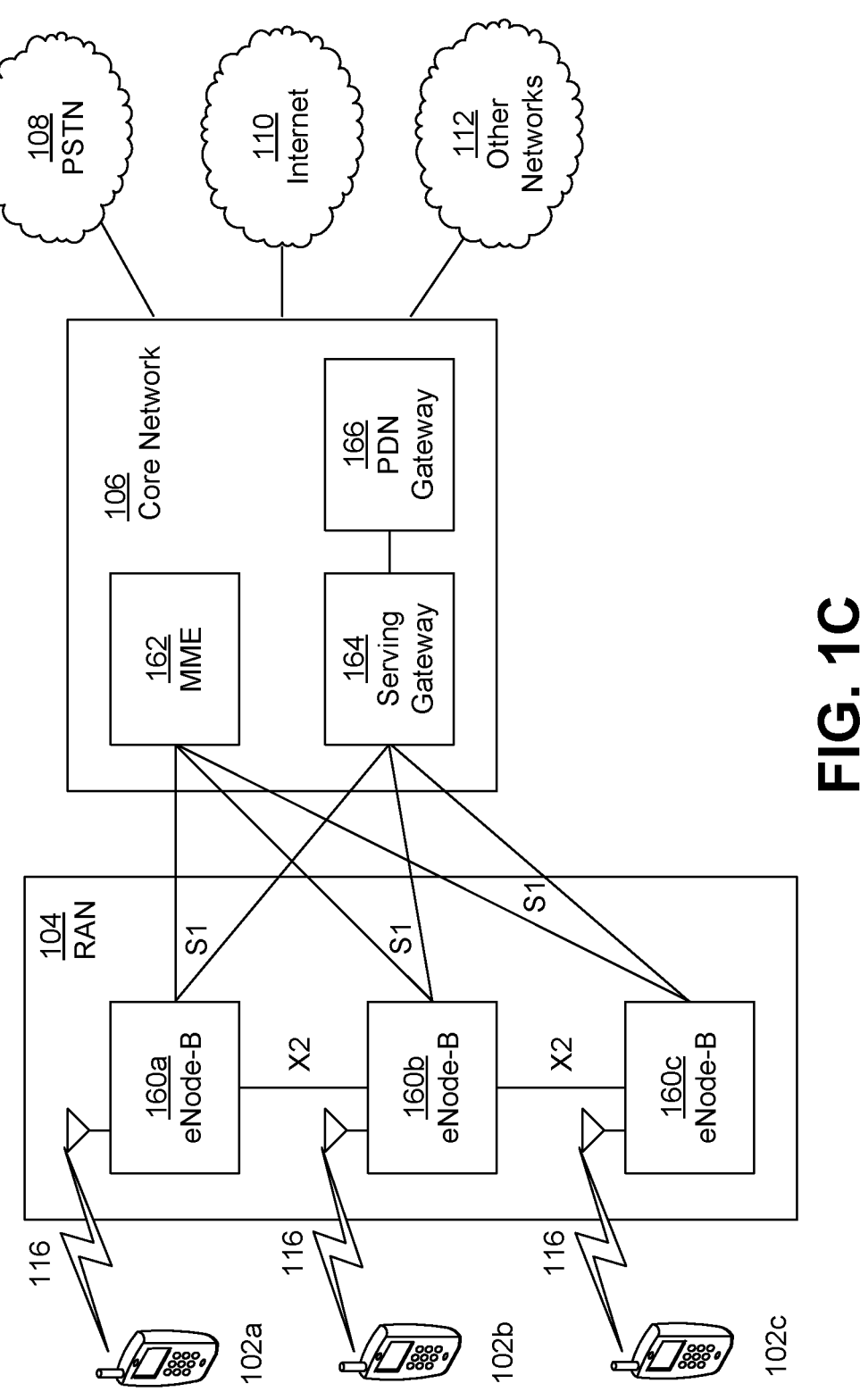
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
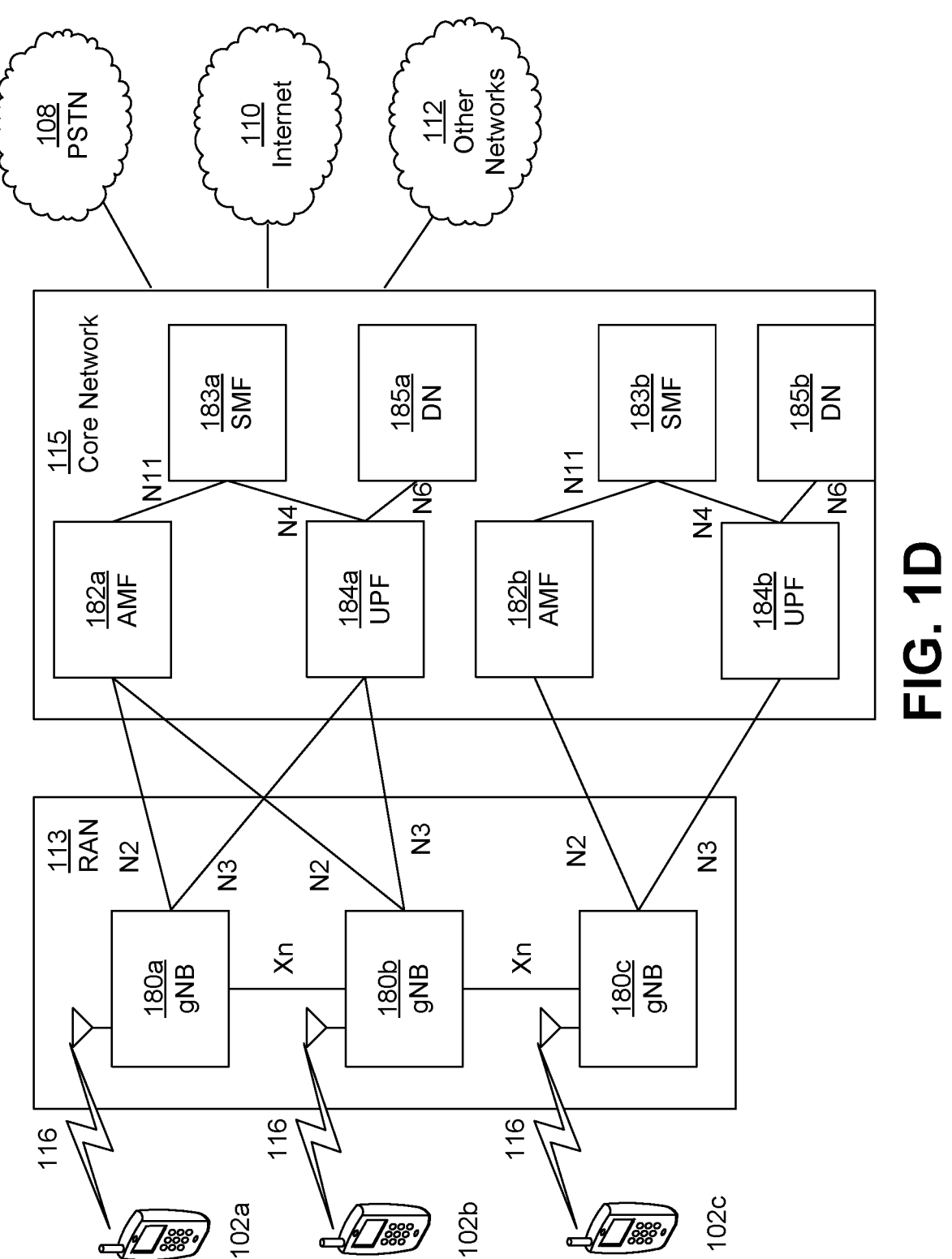
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

New Radio (NR) hybrid automatic repeat request (HARQ) transmission may be performed, for example associated with a Uu interface, e.g., uplink unicast, downlink unicast, downlink groupcast, etc. HARQ ACK/NACK information may be transmitted in a physical uplink control channel (PUCCH). A wireless transmit/receive unit (WTRU) may not (e.g., expect to) transmit more than one PUCCH with HARQ ACK/NACK information in a slot. NR Uu may support five PUCCH formats, for example short PUCCH formats 0 and 2 and long PUCCH formats 1, 3 and 4. A short PUCCH format may assign, for example, one to two symbols for PUCCH transmission. A long PUCCH format may assign, for example, four to 14 symbols for PUCCH transmission. PUCCH format 0 may be sequence-based and an associated frequency resource allocation may be (e.g., fixed at) one resource block (RB).

A WTRU may determine a PUCCH resource to use for a HARQ transmission, e.g., based on a configuration. A configuration may be a semi-static configuration. A (e.g., semi-static) configuration may be received, for example, in radio resource control (RRC) signaling or a system information block (SIB), e.g., before RRC establishment. A WTRU may be configured with (e.g., up to) four PUCCH resource sets. A PUCCH resource set (e.g., each PUCCH resource set) may include, for example, eight different PUCCH resources. A PUCCH resource may include one or more parameters, such as, for example, a Resource ID, a PUCCH format, a starting physical resource block (PRB), a number of PRBs (e.g., for Format 2/3), a starting symbol, a number of symbols, an initial cyclic shift index (e.g., for Format 0/1), an index and length of an orthogonal cover code (OCC) (e.g., for Format 4), etc.

A configuration may be a dynamic configuration. A (e.g., dynamic) configuration may be received, for example, in downlink control information (DCI) format 1_0/1_1 in an NR physical downlink control channel (PDCCH), which may be associated with the NR physical downlink shared channel (PDSCH) corresponding to the HARQ transmission, e.g., including a PDSCH-to-HARQ timing indicator and a PUCCH resource indicator.

A WTRU may (e.g., based on a dynamic configuration) select a PUCCH resource based on, for example, the PUCCH resource indicator, the number of total control channel elements (CCEs) in the control resource set (CORE-SET), and/or the first CCE of the associated NR PDCCH. A WTRU may transmit a PUCCH carrying the HARQ information in the selected PUCCH resource within a slot, which may be determined, for example, based on the PDSCH-to-HARQ timing indicator.

HARQ feedback may be supported in NR sidelink (SL) unicast and groupcast SL transmissions. A (pre-)configuration may (e.g., be used to) indicate whether the SL HARQ feedback is enabled or disabled. There may be conditions in which an SL HARQ feedback is not used, for example, if the SL HARQ feedback is enabled. A WTRU may (e.g., in a unicast transmission) perform decoding of a transport block (TB) carried in a PSSCH based on, for example, the sidelink control information (SCI) received in the associated physical SL shared channel (PSCCH). A WTRU may generate a HARQ ACK, for example, if decoding the TB is successful, or a HARQ NACK, for example, if the decoding fails. A WTRU may (e.g., subsequently) transmit the generated HARQ ACK/NACK information in a physical SL feedback channel (PSFCH). A time gap between the PSFCH and the associated PSSCH may not be signaled (e.g., explicitly) in the SCI carried in the associated PSCCH.

One or more (e.g., two) HARQ transmissions may be considered for groupcast transmission. For example, a HARQ NACK-only transmission may be used. A WTRU may transmit a HARQ NACK in a PSFCH, for example, if it fails to decode a TB based on the SCI decoded from the associated PSCCH. A WTRU may not perform a HARQ ACK transmission, for example, if it successfully decodes the TB. A HARQ NACK-only transmission may reduce HARQ signaling overhead in a groupcast transmission, but may cause issues (e.g., an ambiguity between a successfully received TB and a failed PSCCH decoding). A HARQ ACK/NACK transmission may be used, for example, for groupcast HARQ transmission. A HARQ ACK/NACK transmission may be as per the unicast HARQ transmission disclosed herein.

NR SL implementation(s) may impose stringent requirements on data transmission reliability and latency. NR SL HARQ and PSFCH design may provide highly reliable resource selection for HARQ transmission.

An inter-WTRU collision between HARQ and aperiodic transmission may occur, e.g., in Mode 2 SL transmission. A WTRU may (e.g., in Mode 2 SL transmission) select transmission resources, for example, based on a sensing mechanism. A sensing mechanism may be implemented, for example, for semi-statically periodic (SPS) resource reservation (e.g., used in vehicular communications, such as LTE V2X, for periodic traffic). This type of long-term sensing may not prevent a collision between a HARQ transmission and another aperiodic SL transmission using the same resources. In Mode 2 SL transmission, when congestion level is high, there may not be available resources for HARQ transmission within the required HARQ timing.

In examples, HARQ reception may be limited by half-duplex operation. A WTRU (e.g., due to half-duplex operation) may not be able to receive a HARQ transmission during a transmission period, which may result in a potential missed HARQ transmission and/or data transmission delay, for example, if a WTRU transmits a burst of aperiodic traffic with a low latency requirement. A WTRU may align a set of SL transmissions and an associated HARQ reception based on, for example, the delay budget of each TB to transmit and/or the HARQ timing of each received TB. The impact of half-duplex on HARQ transmission may be reduced, for example, with more frequent transmission/reception (Tx/Rx) switches. For example, a flexible implementation may be used to avoid unnecessary loss of link capacity, e.g., as each Tx/Rx switch may take a symbol out of SL operation. Introducing more Tx/Rx switches in a slot may reduce the impact of the half-duplex constraint, and/or may reduce the link capacity (e.g., if the WTRU hardware needs a dedicated symbol to perform a Tx/Rx switch).

Stand-alone PSFCH transmission may be performed. A WTRU may transmit a stand-alone PSFCH carrying a HARQ ACK/NACK in a slot without PSCCH and PSSCH, for example, if the WTRU does not have data in the buffer to transmit and a HARQ transmission is due according to the HARQ timing of a received TB. Various aspects related to, for example, NR SL PSFCH and slot structure implementation, may be considered. For example, a proper automatic gain control (AGC) settling period and/or an adequate AGC gain may be implemented for the PSFCH, for a WTRU expecting the HARQ transmission, and/or for WTRUs performing sensing.

In examples, an intra-WTRU collision of simultaneous HARQ transmissions may occur. A WTRU may maintain multiple unicast/groupcast links. Two or more HARQ transmissions may fall into the same slot, for example, based on HARQ timings for the two or more transmissions. WTRU handlings may be implemented, for example, regarding how WTRUs prioritize and multiplex the HARQ transmissions, how WTRUs adjust resource allocation and/or transmission parameters, etc., e.g., in order to successfully complete all HARQ transmissions.

A transmitting WTRU may be referred to as a source WTRU. A receiving WTRU may be referred to as a destination WTRU. The following examples may be used herein. A WTRU transmitting a PSSCH and an associated PSCCH may be referred to as a source WTRU (e.g., relative to a HARQ transmission in a PSFCH and an associated data transmission in the PSSCH). A WTRU receiving the PSCCH and PSSCH and transmitting an associated PSFCH may be referred to as a destination WTRU. Source WTRU and destination WTRU labels may be applied relative to the direction of a PSSCH transmission.

Figure 2:
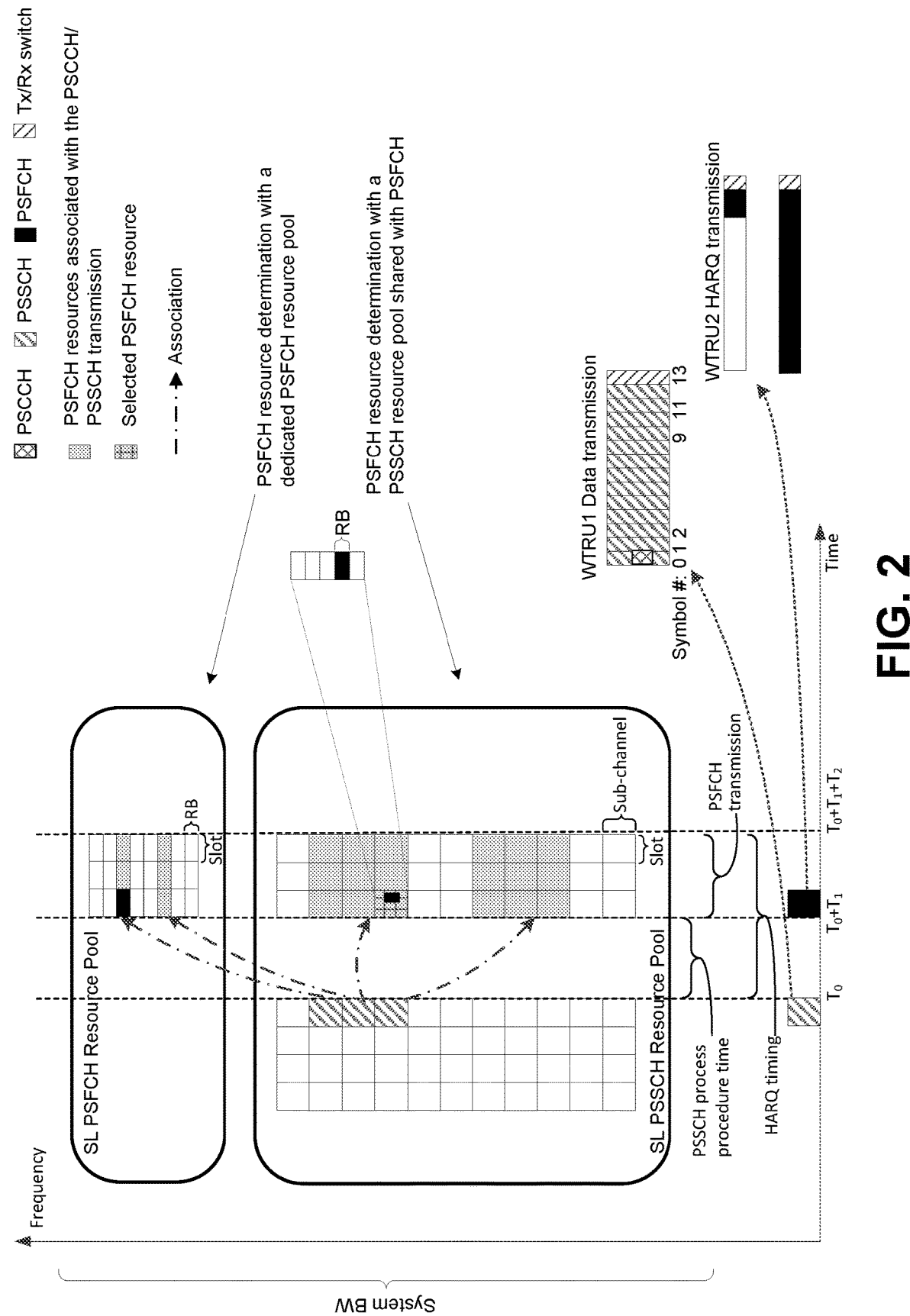
FIG. 2 shows HARQ transmission examples using a dedicated PSFCH resource pool and/or a shared PSCCH resource pool.

A PSFCH resource may be determined. A WTRU may determine a HARQ timing. A WTRU may be (pre-)configured with a set of HARQ timings. A HARQ timing may be based on, for example, a PSSCH-to-HARQ time and/or a HARQ transmission time. FIG. 2 shows HARQ transmission examples using a dedicated PSFCH resource pool and/or a shared PSCCH resource pool. A PSSCH-to-HARQ time may be a time between the end of a PSSCH transmission and the start of an associated HARQ transmission (e.g., $T_1$ shown in FIG. 2). A HARQ transmission time may be a time for the associated HARQ transmission (e.g., $T_2$ shown in FIG. 2). PSSCH-to-HARQ time may account for the time a WTRU may need to decode a PSCCH and the associated PSSCH of a given TB size (e.g., the maximum configurable TB for an SL transmission). HARQ-transmission time may include time to acquire a PSFCH resource and the actual PSFCH transmission (e.g., in Mode 2 operation), and may be bounded by the delay budget of the transmitted TB.

A WTRU may select a HARQ timing of a TB transmission from the (pre-)configured HARQ timing set based on, for example, one or more of a WTRU processing capability, an SL subcarrier spacing, priority information of the TB, and/or a channel busy status. A WTRU may look up these parameters in a (pre-)configured mapping and select a corresponding HARQ timing. For example, the mapping may include a PSSCH-to-HARQ time ($T_1$) of a TB transmission where $T_1$ may be determined, for example, in accordance with Eq. 1:

$$T_1 = T_{WTRU} \times (2048 + 144) \times 2^{-\mu} \times T_s \qquad \text{Eq. 1}$$

$T_{WTRU}$ may be a (pre-)configured WTRU processing capability to decode PSCCH and associated PSSCH (e.g., a number of symbols for each SL subcarrier spacing). $\mu$ may be the subcarrier spacing of PSCCH/PSSCH/PSFCH. An SL transmission and reception bandwidth part (BWP) may be, for example, identical, and subcarrier spacing of PSCCH/PSSCH/PSFCH may be, for example, identical. $T_s$ may be a duration of a sample specific to a system sampling frequency (e.g., $1/F_s$, where $F_s$ may be, for example, 30.72 MHz).

A mapping may include a HARQ-transmission-time ($T_2$) of a TB transmission based on, for example, a HARQ timing upper bound based on the TB's latency requirement, such as a packet delay budget (PDB). A (pre-)configured mapping may indicate a HARQ timing for a (pre-)configured latency requirement (e.g., each requirement) supported by the WTRU (e.g., a low-latency TB transmission may be mapped to a low $T_2$). A mapping may include a HARQ-transmission-time ($T_2$) of a TB transmission based on, for example, an estimate of a time to acquire a PSFCH resource at a given measured channel busy ratio (CBR) level. A (pre)configuration may provide additional time, for example, provided that the resultant $T_2$ may be below the HARQ timing upper bound. In an example, a (pre-)configuration may indicate no additional time for resource acquisition (e.g., zero), for example, if a measured CBR level is below a (pre-)configured threshold, and otherwise (e.g., for high CBR levels at or above the threshold) a slot (e.g., $T_2$) includes, for example, an additional slot.

HARQ timing in a (pre-)configuration may be specified in terms of a number of slots/mini-slots/symbols based on, for example, a sum of the PSSCH-to-HARQ time and HARQ-transmission time values (e.g., $T_1+T_2$ with a reference of $T_0$).

A WTRU may include priority information of the TB and CBR value in the SCI carried in the PSCCH scheduling the PSSCH transmission. A source WTRU and a destination WTRU may obtain related (e.g., identical) HARQ timings, for example, based on a common (pre-)configuration. A source WTRU may monitor a HARQ transmission according to the HARQ timing, for example, between $T_0+T_1$ and $T_0+T_1+T_2$, where $T_0$ may be at the end of the last symbol of the associated PSCCH/PSSCH transmission (e.g., as shown in FIG. 2). A destination WTRU may generate a HARQ ACK/NACK before $T_1$ and transmit a PSFCH (e.g., carrying the HARQ ACK/NACK) between $T_0+T_1$ and $T_0+T_1+T_2$, for example, according to a same or similar HARQ timing.

A WTRU may determine HARQ timing, for example, based on one or more transmission parameters. A HARQ feedback may be transmitted on a PSFCH resource. A set of PSFCH resources may be configured in each slot. A network may configure a PSFCH resource in a subset of slots, for example, for a resource pool. For example, the network may configure one or more of N slots to include a PSFCH resource, where N may be a non-negative integer number (e.g., 0, 1, 2, 4). A resource pool may not include a PSFCH resource, for example, if N=0. A plurality of slots (e.g., all slots) may include a PSFCH resource, for example, if N=1. Even numbered slots or odd number slots may include a PSFCH resource, for example, if N=2.

A WTRU may determine a slot that includes a PSFCH resource for a corresponding HARQ transmission, for example, if the WTRU receives sidelink data (e.g., a PSSCH and/or PSCCH) in a slot #n. The determined slot that includes the PSFCH resource may be referred to as slot #n+a, where a may be a smallest integer larger than or equal to K, e.g., on a condition that slot #n+a includes a PSFCH resource.

In examples, a slot may be a logical slot or a physical slot. A physical slot may be, for example, a slot defined as a frame structure. A logical slot may be, for example, a slot configured, used, and/or numbered for V2X purposes. A logical slot may be configured as a resource pool (e.g., a Tx or an Rx resource pool). Resource pool may be referred to interchangeably with Tx resource pool, Rx resource pool, and/or sidelink resource pool.

A K value for a resource pool or a sidelink transmission may be determined, for example, based on one or more sidelink transmission parameters. Sidelink transmission parameter(s) may include one or more of following. A sidelink transmission parameter may include, for example, a QoS of a packet (e.g., a priority, a reliability, a data rate, a minimum communication range, a latency, etc.). A smaller K value may result in a shorter latency and/or a higher reliability. A sidelink transmission parameter may include, for example, a subcarrier spacing of the sidelink bandwidth part. A smaller K value may be used, for example, if a smaller subcarrier spacing is used. For example, K=2 may be used for 15 kHz and/or 30 kHz subcarrier spacing and K=3 may be used for 60 kHz subcarrier spacing. A sidelink transmission parameter may include, for example, a cyclic prefix length. A sidelink transmission parameter may include, for example, a number of symbols used and/or configured for PSCCH, PSSCH, and/or PSFCH. A sidelink transmission parameter may include, for example, a slot length. A sidelink transmission parameter may include, for example, a number of symbols available in a slot for a sidelink transmission. A first K value may be used, for example, if the number of symbols available for sidelink in a slot is smaller than a threshold. A second K value may be used, for example, if the number of symbols available for sidelink in a slot is equal to or larger than the threshold. A sidelink transmission parameter may include, for example, a number of bandwidth parts configured for sidelink in a carrier. A sidelink transmission parameter may include, for example, a demodulation reference signal (DM-RS) pattern (e.g., a front-loaded DM-RS only or a front-loaded DM-RS with additional DM-RS). A first K (e.g., smaller) value may be used, for example, if a first DM-RS pattern (e.g., a front-loaded DM-RS) is used and a second K (e.g., larger) value may be used, for example, if a second DM-RS pattern (e.g., a front-loaded DM-RS+additional DM-RS) is used. The first K value may be smaller than the second K value.

A sidelink transmission parameter may include, for example, a transmission power level. A sidelink transmission parameter may include, for example, a power control mode. In examples, a first power control mode may use a maximum transmission power allowed or configured. A second power control may be based on, for example, an open-loop power control using pathloss (e.g., Uu pathloss or SL pathloss). In examples, a first power control mode may be based on Uu pathloss and a second power control mode may be based on SL pathloss.

A sidelink transmission parameter may include, for example, a congestion level (e.g., CBR). A first K value may be used, for example, if CBR is higher than a threshold. A second K value may be used, for example, if CBR is lower than the threshold. The first K value may be smaller than the second K value. The resources occupied by a WTRU may be reduced, for example, if (e.g., when) CBR is reduced. A congestion level may be lowered, for example, if the resources occupied by the WTRU are reduced. A sidelink transmission parameter may include, for example, a channel occupancy ratio (e.g., CR). A first K value may be used, for example, if a CR is higher than a threshold and a second K value may be used, for example, if the CR is lower than the threshold. The first K value may be smaller than the second K value. A sidelink transmission parameter may include, for example, an enable and/or disable of CSI feedback. A sidelink transmission parameter may include, for example, a sub-channel size (e.g., a number of RBs used for a subchannel). A sidelink transmission parameter may include, for example, a (e.g., configured) number of resource pools. A sidelink transmission parameter may include, for example, an (e.g., configured) N value (e.g., every N slot includes a PSFCH resource). A sidelink transmission parameter may include, for example, a PSFCH configuration (e.g., a short PSFCH or a long PSFCH). A sidelink transmission parameter may include, for example, a packet size. A smaller K value may be used, for example, if a packet size (e.g., a maximum packet size) is smaller than a threshold for a service. A larger K value may be used, for example, if the packet size is larger than or equal to the threshold for the service. A sidelink transmission parameter may include, for example, a retransmission number. A sidelink transmission parameter may include, for example, a cast type (e.g., groupcast or unicast). In an example, a first K value may be used for a groupcast transmission and a second K value may be used for a unicast transmission. A sidelink transmission parameter may include, for example, an expected transmission/reception of a WTRU in a UL or in another RAT. A WTRU may determine which K value to select. For example, a WTRU may determine which K value to use based on, for example, the expected transmission/reception in the UL or in another RAT. In an example, the WTRU may change from a first K value to a second K value, for example, if the WTRU is expected to receive/transmit in a slot in a UL or LTE RAT overlapping with the PSFCH transmission of the first K value. A sidelink transmission parameter may include, for example, a Tx-Rx distance between WTRUs.

A K value may be determined based on, for example, a WTRU capability. For example, a set of K values may be configured (e.g., K={2,3,4,5}) and a WTRU may determine a smallest number of K values based on the WTRU capability. A WTRU capability may be exchanged between WTRUs (e.g., via PC5-RRC), for example, for a sidelink unicast and/or groupcast transmission. A WTRU capability may be reported to the network.

One or more K values may be used, and a K value may be configured for a resource pool. For example, the one or more K values may include K={2, 3, 4, 5, 6} and one of the K values may be configured for a resource pool. The WTRUs (e.g., all WTRUs) in the same resource pool may use the same configured K value. A subset of K values may be (e.g., allowed to be) used, for example, based on one or more of following. A subset of K values may be used based on, for example, a QoS (e.g., QoS limit) configured for a resource pool. For example, a resource pool may be configured with a QoS limit. A packet may not be transmitted on the sidelink resource pool, for example, if a QoS of the packet is below the QoS limit. K values (e.g., all K values) may be configured, for example, if a QoS limit is lower than a threshold. A subset of K values (e.g., K={2}) may be configured, for example, if a QoS limit is higher than a threshold. A subset of K values may be used based on, for example, a subcarrier spacing. A subset of K values may be used (e.g., K={4,5}), for example, if a subcarrier spacing configured for a resource pool is higher than a threshold. K values (e.g., all K values) may be used or another subset of K values may be used (e.g., K={2,3}), for example, if a subcarrier spacing configured for a resource pool is lower than or equal to a threshold. A subset of K values may be used based on, for example, a DM-RS pattern. One or more DM-RS patterns (e.g., a time density and/or a frequency pattern) may be used. A subset of DM-RS patterns may be configured for a resource pool. A subset of K values applicable for the resource pool may be determined, for example, based on the set of DM-RS patterns configured for a resource pool. Smaller K values (e.g., K values with a smaller number) may be used (e.g., K={2,3}), for example, if front-loaded DM-RS patterns are (e.g., only front-loaded DM-RS patterns) configured for a resource pool. A front-loaded DM-RS pattern may be referred to as the DM-RS pattern where DM-RS symbols are located within a first half of the slot. Larger K values (e.g., K values with a larger number) may be used (e.g., K={4, 5, 6}), for example, if front-loaded DM-RS patterns with additional DM-RS patterns are configured for a resource pool. A subset of K values may be used based on, for example, a number of symbols used for PSCCH in a subchannel. The number of symbols used for a PSCCH within a subchannel may be predefined, preconfigured, and/or determined based on, for example, one or more transmission parameters.

A subset of K values used for a resource pool may be determined based on, for example, one or more sidelink transmission parameters.

One or more K values may be configured for a resource pool. A WTRU may determine which K value of the one or more configured K values to use for a sidelink transmission, for example, based on one or more of following. A WTRU may determine which K value to use for a sidelink transmission based on, for example, one or more of sidelink transmission parameters. A (e.g., single) PSSCH/PSCCH transmission may be associated with a plurality of PSFCH resources. For example, a PSSCH/PSCCH transmission in slot #n may be associated with a PSFCH resource in slot #n+a1 and another PSFCH resource in slot #n+a2. A WTRU may determine which PSFCH resource to use based on, for example, the determined K value. In an example, a WTRU may (e.g., determine to) use a PSFCH resource in slot #n+a1, for example, if K=2 is used. The WTRU may (e.g., determine to) use a PSFCH resource in slot #n+a2, for example, if K=3 is used. A single sidelink transmission (e.g., PSCCH/PSCCH) may be associated with a set of PSFCH resources within a slot #n+a. A (e.g., one) PSFCH resource in a slot may be determined based on, for example, at least one of an ID (e.g., source-ID, destination-ID, a group member ID), one or more sidelink transmission parameters, and/or a number of member WTRUs within a group. A group member ID may be an ID assigned for a WTRU within a group for groupcast. A subset of K values may be used based on, for example, a WTRU capability. In an example, WTRU capability information may be reported to a network or exchanged via PC5-RRC between WTRUs, e.g., for unicast or groupcast. A subset of K values may be used based on, for example, a configuration of N. For example, K may be determined as a function of N.

A K value may be referred to as, for example, a reference timing of PSFCH resource determination, a HARQ reference timing, a HARQ minimum required time, a minimum required processing time, and/or a PSFCH timing.

One or more subsets of PSFCH resources may be configured. A (e.g., each) subset of PSFCH resources may be associated with a (e.g., specific) K value and/or a cast type (e.g., groupcast, unicast). For example, M subsets of PSFCH resources may be configured with M K values (e.g., K={1, 2, 3, . . . , M}). A (e.g., each) K value may be associated with a subset of PSFCH resources. A WTRU may determine a PSFCH resource within an associated subset of PSFCH resources, for example, if (e.g., when) a WTRU determines a K value. A subset of PSFCH resources may be referred to as, for example, a PSFCH resource pool. Resources across subsets of PSFCH resources may be mutually exclusive.

A WTRU may determine a PSFCH resource pool. A WTRU may be (pre-)configured with one or more resource pools for PSSCH transmissions. A PSSCH frequency resource in a PSSCH resource pool may be sub-channel-based. A sub-channel (e.g., each sub-channel) may include a (pre-)configured number of RBs. A PSSCH time resource in the PSSCH resource pool may be slot-based. A WTRU may perform PSSCH resource allocation based on, for example, a granularity of a sub-channel in frequency domain and a slot in a time domain. A WTRU may be (pre-)configured to apply a PSSCH resource pool for PSFCH resource allocation (e.g., a shared resource pool between PSSCH and PSFCH transmission).

A WTRU may be (pre-)configured with one or more resource pools for PSFCH transmission. A WTRU being (pre-)configured with a resource, resource pool, etc. may describe a WTRU receiving the resource, resource pool, etc. or being preconfigured with the resource, resource pool, etc. A PSFCH resource pool may not overlap with the PSSCH resource pool in frequency domain (e.g., a dedicated PSFCH resource pool). A WTRU may (e.g., for shared and dedicated PSFCH resource pools) perform PSFCH resource allocation based on, for example, a granularity of an RB in the frequency domain and a symbol in the time domain.

A WTRU may determine whether a shared or dedicated PSFCH resource pool may be used for a HARQ transmission associated with a TB transmission based on, for example, a QoS requirement (e.g., ProSe per packet priority (PPPP), ProSe per packet reliability (PPPR), and/or PDB) and/or a channel busy status (e.g., CBR). A WTRU may select a dedicated PSFCH resource pool for a HARQ transmission associated with a TB, for example, if QoS requirements of the TB (e.g., priority (e.g., PPPP) and/or reliability (e.g., PPPR)) are higher than a (pre-)configured threshold, and/or latency (e.g., PDB) is lower than a (pre-)configured threshold. A WTRU may select a shared PSFCH resource pool for a HARQ transmission, for example, if the measured CBR of the dedicated PSFCH resource pool is higher than the CBR of the shared PSFCH resource pool and the difference exceeds a (pre-)configured threshold.

A WTRU may select a dedicated PSFCH resource pool to apply based on, for example, one or more of the following properties: a set of consecutive RBs, QoS requirement thresholds (e.g., PPPP, PPPR, and/or PDB), traffic types (e.g., unicast and/or groupcast), and/or a maximum Doppler frequency supported. One or more properties may be (pre-)configured, e.g., for each dedicated PSFCH pool. A WTRU may use a dedicated PSFCH pool for a HARQ transmission, for example, if the QoS requirement of the associated TB transmission is higher than the threshold. A WTRU may determine a traffic type, for example, based on information from the received PSSCH/PSCCH transmission, which may include, for example, a radio network temporary identifier (RNTI) used to scramble CRC of an SCI for PSCCH, an SCI format, SCI contents, a DM-RS configuration (e.g., Type-1 or Type-2 mapping, or DMRS time and/or frequency density for PSCCH and/or PSSCH). A maximum Doppler frequency may be (pre-)configured for a (e.g., each) dedicated PSFCH resource pool. A WTRU may use a PSFCH resource pool, for example, if the estimated maximum Doppler frequency (e.g., relative Doppler frequency of two WTRUs of a link) is lower than the (pre-)configured maximum Doppler frequency.

A WTRU may include PSFCH resource pool information in the PSCCH scheduling of the PSSCH associated with the HARQ transmission. PSFCH resource pool information may indicate, for example, whether a dedicated or shared PSFCH resource pool may be applied. A WTRU may use the same PSSCH resource pool used by the PSSCH transmission associated with the PSFCH transmission, for example, if the shared PSFCH resource pool is applied. PSFCH resource pool information may indicate which dedicated PSFCH resource pool may be selected.

A bit field in the SCI may provide a set of codepoints to convey PSFCH resource pool information. The length of the field may depend on, for example, the number of (pre-)configured dedicated PSFCH resource pools. In an example, a 2-bit field may indicate a shared PSFCH pool, for example, by setting both bits to zero, and may provide the index of a dedicated PSFCH resource pool, for example, by setting one or both of the bits to one.

A WTRU may determine a PSFCH resource in a dedicated PSFCH resource pool. A WTRU may select a PSFCH resource from a dedicated PSFCH resource pool, and/or may determine properties of a PSFCH resource the WTRU needs to select (e.g., a number of RBs). In examples, a WTRU may determine PSFCH resources based on, for example, a (pre-)configured association between a dedicated PSFCH resource pool and a PSSCH resource pool. A WTRU may determine a PSFCH resource in the dedicated PSFCH resource pool based on, for example, a (pre-)configured association with the PSSCH resource pool used for the associated PSCCH/PSSCH transmission. A WTRU may be (pre-)configured, for example, with a mapping between a sub-channel (e.g., each subchannel) in a PSSCH resource pool and a PSFCH resource in the dedicated PSFCH resource pool. A PSSCH sub-channel may be mapped to more than one PSFCH resource (e.g., as shown in FIG. 2), for example, depending on the number of sub-channels in the PSSCH resource pool and PSFCH resources in the dedicated PSFCH resource pool. A WTRU may determine one or more PSFCH resources in the dedicated PSFCH resource pool based on, for example, the first sub-channel used for the PSSCH or PSCCH transmission and the mapping. A WTRU may repeat a PSFCH transmission (e.g., with multiple PFSCH resources) in a PSFCH resource (e.g., each PSFCH resource). In a PSFCH resource (e.g., each PSFCH resource), a WTRU may perform sensing in the beginning of the slot and proceed with PSFCH transmission in the same slot, for example, if a collision is not indicated by sensing.

A WTRU may sense PSFCH resources in a dedicated PSFCH resource pool. A WTRU (e.g., a WTRU that is not the destination of the PSSCH transmission) may decode the PSSCH scheduling information in the SCI in the PSCCH and may determine the associated PSFCH transmission resource. A WTRU may determine a PSFCH resource in a dedicated PSFCH resource pool based on, for example, a PSSCH/PSCCH resource allocation. A WTRU may determine a PSFCH resource to be reserved for a period between the minimum and maximum (pre-)configured HARQ timing. A WTRU may exclude a PSSCH resource that may result in the same PSFCH resource in the dedicated PSFCH resource pool within the HAQR timing period, for example, to avoid potential collision of PSFCH transmissions.

A WTRU may determine a PSFCH resource in a shared PSFCH resource pool. A WTRU may select a PSFCH resource from a shared PSFCH resource pool, and/or may determine properties of a resource the WTRU may (e.g., need to) select (e.g., a number of RBs). A WTRU may determine sub-channel(s) to include PSFCH resources. A source WTRU may determine a PSFCH sub-channel based on, for example, transmissions from a destination WTRU. A source WTRU may determine a PSFCH sub-channel associated with a PSSCH transmission based on, for example, one or more transmissions (e.g., received from a destination WTRU), which may include, for example, one or more of an RS transmission (e.g., SL-CSI-RS, SL-RLM-RS, etc.), a PSCCH/PSSCH transmission, and/or a HARQ transmission. A WTRU may perform measurements on transmissions, e.g., to obtain measurement metrics including, for example, a sub-band-channel quality indicator (CQI), SL-RSRP, L1-RSRP, SL-received signal strength indicator (RSSI), signal-to-noise-ratio (SNR), etc. A WTRU may select a sub-channel for PSFCH transmission based on, for example, measurement metrics (e.g., the sub-channel with the best sub-band-CQI for a HARQ transmission).

A source WTRU may determine a PSFCH sub-channel, for example, based on sensing. A source WTRU may determine PSFCH resources associated with a PSSCH, for example, based on a sensing result. A source WTRU may select a PSFCH sub-channel from available resources determined by, for example, the sensing within the HARQ timing. For example, a source WTRU may select the earliest available resource within the determined HARQ timing.

A source WTRU may determine a PSFCH sub-channel and an indication in the SCI. A WTRU may (e.g., be (pre-)configured to) perform a source WTRU PSFCH sub-channel determination (e.g., as disclosed herein) based on, for example, one or more of the following: a PSFCH resource allocation mode, applicability of the destination WTRU transmissions, a channel busy ratio, a TX-RX distance between a source WTRU and a destination WTRU, and/or a QoS requirement. A source WTRU may (e.g., be (pre-)configured to) perform PSFCH resource allocation.

A source WTRU may determine a PSFCH sub-channel, for example, if the source WTRU receives destination WTRU transmissions within a (e.g., (pre-)configured) period preceding the PSSCH transmission. The sum of the length of the period and the HARQ timing of the PSSCH transmission may not exceed a channel coherent time (e.g., the channel condition based on the transmissions received during the period may be applicable at the HARQ timing). A period may be short, for example, for high mobility WTRUs.

A source WTRU may determine a PSFCH sub-channel, for example, if the measured channel busy ratio (CBR) is below a (pre-)configured threshold. A collision probability (e.g., caused by other WTRUs using the same transmission resources) may be low.

A source WTRU may determine a PSFCH sub-channel, for example, if the TX-RX distance is below a (pre-)configured threshold based on, for example, SL measurements (e.g., including SL-RSRP, SL-RSSI, etc.). A sensing result obtained by a source WTRU and a destination WTRU may become correlated, for example, if the distance between the source and destination WTRUs is smaller than the threshold.

A source WTRU may not perform a PSFCH sub-channel determination, for example, if a QoS requirement (e.g., PPPP, PPPR, and/or PDB) is above (pre-)configured threshold.

A WTRU may include PSFCH resource reservation information in an SCI, e.g., carried in the PSCCH scheduling a PSSCH corresponding to the HARQ transmission. For example, a source WTRU may indicate a PSFCH sub-channel allocation in a bit field in an SCI with other HARQ information (e.g., HARQ process ID). Source WTRU determination of a PSFCH sub-channel may result in a reduction of time needed or used by a destination WTRU to acquire a PSFCH resource, e.g., via sensing. A PSFCH resource reservation in an SCI may be decoded (e.g., via sensing) by other WTRUs (e.g., and may be used to prevent collisions).

FIG. 2 shows HARQ transmission examples using a dedicated PSFCH resource pool and/or a shared PSCCH resource pool. In examples, a dedicated PSFCH frequency resource allocation, e.g. a dedicated PSFCH resource pool, may be (pre)configured. A dedicated PSFCH frequency resource allocation may include PSFCH frequency resources, e.g. a set of sub-channels and/or RBs, that may not be used for PSSCH transmission. In examples, a shared PSFCH frequency resource allocation, e.g. a shared PSFCH resource pool may be (pre)configured. A shared PSFCH frequency resource allocation may include PSFCH frequency resources, e.g. a set of sub-channels and/or RBs, that may be used for PSSCH transmission. Within the PSFCH frequency resource allocation, a set of PSFCH frequency resources, e.g. a set of RBs, may be associated with a PSSCH transmission and may be applied to transmit HARQ feedback corresponding to the PSSCH transmission. Within the associated PSFCH frequency resource set, a WTRU may determine a PSFCH frequency resource, e.g. one RB, for the actual PSFCH transmission. The determination may be based on WTRU Source ID and/or HARQ process ID.

A destination WTRU may determine PSFCH resources based on, for example, associated PSCCH/PSSCH transmissions. A WTRU may not receive PSFCH resource allocation information for a HARQ transmission in the SCI carried in the PSCCH scheduling the corresponding PSSCH transmission. A WTRU may determine a PSFCH resource allocation (e.g., when using a shared PSFCH resource pool) based on, for example, one or more of the following: WTRU physical layer (PHY) ID information (e.g., including Source ID, Destination ID, HARQ Process ID, etc.), Link ID information (e.g., including link ID, group ID, service ID, etc.), a PSCCH frequency resource (e.g., including PSCCH sub-channel and RB allocation), a PSSCH frequency resource (e.g., including PSSCH sub-channel and RB allocation), a DM-RS resource and sequence configuration for PSCCH and PSSCH, an associated SL transmission QoS parameter (e.g., priority, reliability, latency and range), a (e.g., an existing) resource reservation for a future PSSCH/RS transmission to the source WTRU, a CBR, and/or a TX-RX distance between the source WTRU and the destination WTRU. Link ID information may be used, for example, to distinguish multiple established unicast/groupcast transmissions.

A WTRU may determine sub-channels (e.g., to include PSFCH resources in) based on, for example, a WTRU PHY ID. A WTRU may determine one or more sub-channels (e.g., to include PSFCH resources in) based on, for example, one or more of a source ID, a destination ID and/or a HARQ process ID. A WTRU may select a sub-channel whose index equals the result of an arithmetic operation (e.g., a modulo function) based on, for example, the source ID and/or destination ID and the total number of PSSCH sub-channels in the PSSCH resource pool.

A WTRU may select sub-channels (e.g., to include PSFCH resources in) based on, for example, a PSCCH/PSSCH frequency resource and/or a QoS requirement. A WTRU may determine a subset of PSSCH sub-channels (e.g., to include PSFCH resources in) based on, for example, the QoS of the associated TB transmission. A QoS may include one or more QoS parameters (e.g., PPPP, PPPR, and/or range). A WTRU may use a sub-channel of a PSSCH (e.g., starting from the sub-channel with the lowest sub-channel index within the PSSCH subchannels used by the associated PSFCH transmission), for example, if the QoS is lower than a (pre-)configured threshold. A WTRU may select one or more (e.g., all) PSSCH sub-channels (e.g., to include PSFCH resources in), for example, if the QoS is higher than a (pre-)configured threshold.

A WTRU may select sub-channels (e.g., to include PSFCH resources) based on, for example, a PSCCH frequency resource. A WTRU may determine a subset of PSCCH sub-channels (e.g., to include PSFCH resources in) based on, for example, the PSCCH sub-channel allocation. For example, a WTRU may select (e.g., for PSFCH transmission) sub-channel(s) used for associated PSCCH transmission.

A WTRU may select sub-channels (e.g., to include PSFCH resources in) based on, for example, SL coverage level. A WTRU may determine a subset of PSCCH sub-channels (e.g., to include PSFCH resources in) based on, for example, the SL coverage level. For example, a WTRU may apply a repetition of the associated PSFCH(s) in a selected sub-channel (e.g., each selected sub-channel), for example, if a TX-RX distance is larger than a (pre-)configured threshold. The threshold may be based on, for example, the range used (e.g., required) by the associated TB transmission.

A WTRU may select sub-channels (e.g., to include PSFCH resources in) based on, for example, a WTRU PHY ID and/or a Link ID. A WTRU may determine a PSSCH sub-channel (e.g., whose index is equal to the result of an arithmetic operation, such as a modular function) based on, for example, the PHY ID and/or Link ID and the total number of sub-channels used by the associated PSSCH.

A WTRU may select sub-channels (e.g., to include PSFCH resources in) based on, for example, a CBR. A WTRU may determine a PSSCH sub-channel based on, for example, a measured CBR level. For example, a WTRU may select one or more (e.g., all) PSSCH sub-channels (e.g., to include PSFCH resources in), for example, if the measured CBR is higher than a (pre-)configured threshold.

A WTRU may determine a HARQ ACK/NACK sequence based on, for example, a WTRU PHY ID. A WTRU may determine a sequence for a PSFCH transmission based on, for example, one or more of HARQ ACK/NACK information, a source ID, a destination ID, a link ID, a HARQ process ID, and/or associated PSFCH resources (e.g., a PSFCH symbol/slot number). A WTRU may determine a cyclic shift index of a HARQ ACK/NACK sequence based on, for example, a HARQ process ID, which may distinguish concurrent PSFCH transmissions to the same source WTRU associated with different TB transmissions. A WTRU may determine a cyclic shift index of a HARQ ACK/NACK sequence based on, for example, a source ID, e.g., to differentiate HARQ ACK/NACKs provided to different source WTRUs.

A WTRU may determine a PSFCH resource, for example, using a (e.g., an existing) resource reservation for a future PSSCH/RS transmission to the source WTRU. A WTRU may (e.g., determine to) use one or more (e.g., all) resources a WTRU has reserved for a PSSCH or RS transmission for a HARQ transmission, for example, if the reserved resources satisfy the HARQ timing. A WTRU may determine a PSFCH resource (e.g., as disclosed herein) and may multiplex the PSFCH with a scheduled PSSCH transmission.

Figure 3:
FIG. 3 shows an example of multiplexing PSFCH and PSSCH transmissions in a previously-reserved resource.
Figure 3:
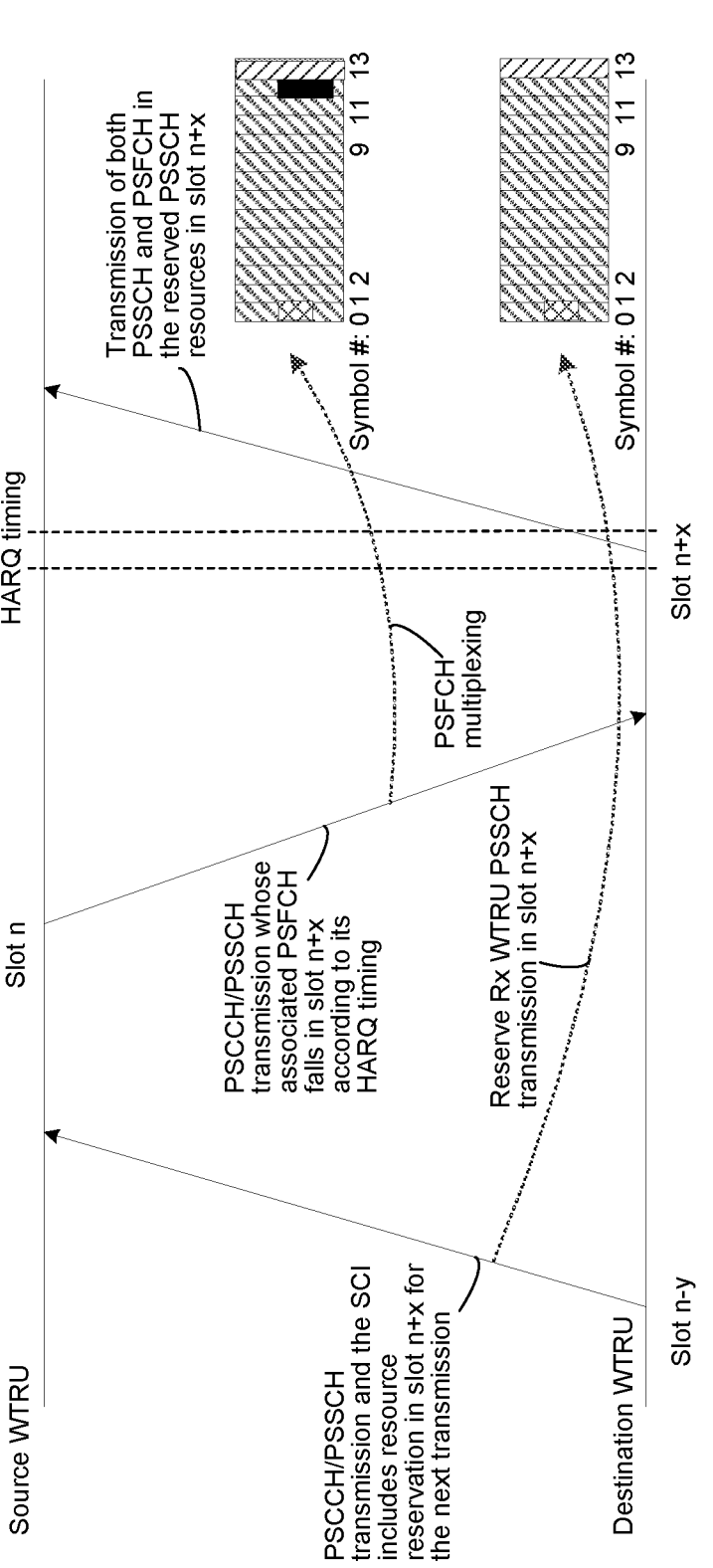

FIG. 3 shows an example of multiplexing PSFCH and PSSCH transmissions in a previously-reserved resource. As shown in FIG. 3, a source WTRU with regard to the PSSCH transmission in slot n may have received a PSSCH transmission from the destination WTRU in slot n-y, which may have reserved a resource in slot x+n for a future PSSCH transmission. The PSSCH transmission in slot n may have an associated HARQ timing in slot n+x. The source and destination WTRUs may (e.g., determine to) multiplex the PSFCH transmission in the scheduled PSSCH transmission. The source and destination WTRUs may be (pre-)configured with puncturing or rate-matching for the PSSCH transmission, e.g., to accommodate the PSFCH transmission.

A WTRU may (e.g., determine to) multiplex PSFCH with a periodic/SPS/aperiodic RS transmission with reserved resources that satisfy the HARQ timing. A WTRU may be (pre-)configured with a priority handling, for example, if multiplexing between PSFCH and RS transmissions is not feasible. For example, a WTRU may be (pre-)configured to drop an RS transmission and transmit a PSFCH in the resource reserved for the RS transmission (e.g., if multiplexing is not feasible).

A WTRU may determine PSFCH resources within a sub-channel. A PSFCH resource may be defined, determined, configured, and/or used based on, for example, one or more of the following: one or more (e.g., a set of) RBs (e.g., contiguous or non-contiguous) within a sub-channel, a carrier, and/or a BWP, one or more (e.g., a set of) symbols (e.g., contiguous or non-contiguous) within a slot, one or more (e.g., a set of) transmission sequences (e.g., Zadoff-Chu (ZC) sequences), an associated DM-RS configuration (e.g., type-1 or type-2 DMRS mapping), a scrambling sequence for a DM-RS, and/or an associated orthogonal cover code (OCC) configuration (e.g., length and/or index of the OCC).

One or a set of RBs (e.g., contiguous or non-contiguous) within a sub-channel, carrier, and/or BWP may be indicated, for example, by a starting RB (e.g., an index of the first RB of a PSFCH resource) and/or by a bandwidth (e.g., a number of consecutive RBs of a PSFCH resource).

A symbol may be, for example, a digital Fourier transform spread OFDM (DFT-s-OFDM) or a cyclic prefix OFDM (CP OFDM) symbol. The symbol may be indicated, for example, by a starting symbol (e.g., an index of the first symbol of a PSFCH resource), a duration, and/or a length (e.g., a number of consecutive symbols of a PSFCH resource).

A transmission sequence may be indicated, for example, by a cyclic shift index. A DM-RS density in frequency and/or time may be different based on, for example, the associated DM-RS configuration. A scrambling sequence may be initialized based on, for example, a sub-channel index.

A WTRU may determine a PSFCH resource (e.g., within a sub-channel) based on, for example, one or more of the following: a (pre-)configuration, a PHY ID (e.g., a Source ID, Destination ID, HARQ Process ID), a Link ID (e.g., a link identity and/or a link index that a WTRU may use to maintain and distinguish multiple established unicast and groupcast transmissions), an SCI format type carried in the PSCCH (e.g., a unicast SCI and/or groupcast SCI), a QoS parameter of the associated TB (e.g., a priority, reliability, latency, and/or range), a PSSCH resource configuration (e.g., a sub-channel size and/or slot duration), and/or a PSSCH transmission slot number.

A PSFCH may occupy one or more symbols and/or RBs. A PFSCH resource may be (pre-) configured to use one or more consecutive symbols (e.g., immediately) before the Tx/Rx switch symbol at the end of a slot (e.g., one symbol at symbol #12 or two symbols at symbol #11 and #12).

A WTRU may determine the number of symbols of a PSFCH resource based on, for example, the symbols, RBs and/or CCEs occupied by the associated PSCCH. For example, a WTRU may be (pre-)configured with a mapping between the number of symbols and/or RBs of a PSFCH and the number of CCEs used by the PSCCH. For example, a large number of CCEs may be used for a PSCCH scheduling a TB transmission with a high range requirement. The mapping may indicate one or more (e.g., all) symbols in a slot used for a PSFCH transmission, for example, if the number of CCEs exceeds a (pre-)configured threshold.

A WTRU may determine the number of symbols and/or RBs for PSFCH transmission based on, for example, the QoS requirements of the associated TB transmission (e.g., indicated in the received PSCCH). For example, a WTRU may use multiple symbols for a PSFCH transmission associated with a TB transmission of PPPP and/or PPPR higher than a (pre-)configured threshold. A WTRU may apply one or more (e.g., all) symbols in a slot for a PSFCH transmission associated with a TB transmission that requires a range (e.g., a TX-RX distance) larger than a (pre-)configured threshold.

A WTRU may determine a PSFCH starting RB based on, for example, a WTRU PHY ID (e.g., a Source ID, Destination ID, and/or Link ID). In an example, a WTRU may determine a starting RB index using an arithmetic operation (e.g., a modulo function) based on, for example, a part of a PHY/Link ID (e.g., one or more most significant bits (MSBs)) and the number of RBs in the sub-channel.

A WTRU may determine a PSFCH starting RB, for example, based on whether the PSFCH is associated with a unicast or groupcast transmission. For example, a WTRU may be (pre-)configured with an RB index offset for PSFCH transmission associated with a group cast transmission. A PSFCH for a unicast transmission may be at the bottom of the sub-channel. A PSFCH for a groupcast transmission may be at the top of the channel.

A WTRU may determine a PSFCH starting RB based on, for example, the associated PSCCH frequency resource allocation. For example, a WTRU may determine a PSFCH starting RB based on, for example, the starting PSCCH RB and/or the index of the PSSCH sub-channel, e.g., including the PSCCH resource. A WTRU may use for a PSFCH an RB used by the associated PSCCH.

A WTRU may determine a PSFCH starting RB based on, for example, a HARQ process ID. For example, a WTRU may use an RB with an index that is the same as the result of an arithmetic operation (e.g., a modular function) based on, for example, the number of RBs of the sub-channel and the number of supported HARQ processes.

A WTRU may determine a PSFCH starting RB based on, for example, a pre-defined formula. A pre-defined formula may include one or more parameters, such as one or more of the following: a PSSCH transmission slot, a PSSCH sub-channel index, a WTRU ID, and/or a HARQ process ID.

A WTRU may select a PSFCH resource from a plurality of PSFCH resources corresponding to a PSSCH transmission (e.g., one PSSCH transmission).

A WTRU may determine a set of PSFCH resources associated with the PSSCH transmission (e.g., one PSSCH transmission), for example, as described herein. For example, a WTRU may determine a set of PSFCH resources that may be located at the same symbol(s) in a time slot (e.g., one time slot) and may occupy multiple contiguous sub-channel(s) and/or multiple contiguous RB(s) within a sub-channel. A WTRU may determine a set of PSFCH resources based on, for example, a time slot, a frequency allocation of the received PSSCH (e.g., the index of the time slot), a lowest PSSCH sub-channel index, and/or a PSCCH sub-channel index.

A WTRU may select a PSFCH resource (e.g., one PSFCH resource) among (e.g., the determined) PSFCH resources to transmit the HARQ ACK/NACK information corresponding to a received PSSCH. A WTRU may select a PSFCH resource based on, for example, one or more of the following. A WTRU may select a PSFCH resource based on, for example, an availability (e.g., based on a sensing result). A WTRU may select a PSFCH resource based on, for example, a pre-configuration. A WTRU may select a PSFCH resource based on, for example, an L1 Source ID. A WTRU may receive an L1 Source ID, for example, in an SCI associated with the PSSCH. A WTRU may select a PSFCH resource based on, for example, a HARQ process ID. A WTRU may receive a HARQ process ID, for example, in the SCI associated with the PSSCH. A WTRU may select a PSFCH resource based on, for example, a PSSCH cast type. A WTRU may receive a PSSCH cast type, for example, in the SCI associated with the PSSCH. The PSSCH cast type may indicate whether the received PSSCH is unicast or groupcast. A WTRU may select a PSFCH resource, for example, based on whether simultaneous multiple PSFCH transmissions are performed using PSFCH resources within the same PSFCH resource set. A plurality of PSSCHs received by a RX WTRU may be associated with the same PSFCH resource set. A plurality of PSSCHs may be in the same time slot and different sub-channels. A plurality of PSSCHs may be in different time slots and the same sub-channel(s). A WTRU may select a PSFCH resource, for example, based on whether PSSCH is transmitted in the time slot where the PSFCH resource set may be located. A WTRU may select a PSFCH resource, for example, based on whether a PSSCH transmission and a PSFCH transmission are for the same WTRU.

A WTRU may select a pre-configured PSFCH resource from a set of PSFCH resources. A pre-configured PSFCH resource may be, for example, a PSFCH resource with a lowest sub-channel index, a highest sub-channel index, or a sub-channel in the middle of a frequency range occupied by the set of PSFCH resources. In an example, a WTRU may select a PSFCH resource in order of a lowest sub-channel index to a highest sub-channel index to a sub-channel in the middle of a frequency range occupied by the set of PSFCH resources. A WTRU may use an order of selection to select the PSFC resource, for example, depending on which resource is available (e.g., based on a sensing result).

A WTRU may select a PSFCH resource based on an L1 Source ID and/or a HARQ ID. A WTRU may use a pre-defined hash function to determine (e.g., compute) an RB index of a PSFCH resource. An L1 Source ID and/or a HARQ ID may be inputs to a pre-defined hash function.

A WTRU may be (pre)configured with unicast and groupcast PSFCH resources within a PSFCH set. A WTRU may select a corresponding PSFCH resource based on, for example, the cast type (e.g., unicast or groupcast) of the PSSCH associated with PSFCH transmission.

An RX WTRU may (e.g., determine to) use multiple PSFCH resources occupying contiguous frequency resources, for example, if (e.g., when) the Rx WTRU performs multiple (e.g., simultaneous) PSFCH transmissions. For example, an RX WTRU may transmit PSFCH transmissions in adjacent RB(s). An RX WTRU may adjust a power level of a (e.g., each) PSFCH transmission, for example, to maintain a power offset between the PSFCHs within a (pre)configured threshold. A (pre)configured threshold may depend on, for example, an absolute PSFCH power. For example, an RX WTRU may set a PSFCH power level for a (e.g., each) PSFCH transmission at a highest individual PSFCH power based on, for example, a PSFCH power control. An adjacent frequency allocation and PSFCH power adjustment may maintain a WTRU transmission efficiency above a predefined threshold and/or may reduce spurious and inter-modulation interferences.

A WTRU may select a PSFCH resource in a sub-channel that may be selected for a PSSCH transmission in the same slot. For example, a WTRU may transmit a PSSCH transmission in a first part of a time slot (e.g., symbol 0 to symbol 11). A WTRU may transmit a PSFCH transmission in a second part (e.g., the remainder) of the time slot. The second part of a time slot may include, for example, symbol 12. Symbol 13 of the time slot may be used for a TX/RX switch. A WTRU may select a PSFCH resource allocated in a (e.g., one) sub-channel among a plurality of sub-channels used by the PSSCH transmission, for example, if the PSSCH transmission and the PSFCH transmission are for the same WTRU. A WTRU may select a PSFCH resource allocated in a sub-channel that is not included in the PSSCH sub-channels, for example, if the PSSCH transmission and the PSFCH transmission are for different WTRUs. A WTRU may use a gap between the PSSCH transmission and the PSFCH transmission in the time slot. The gap may, for example, have a duration of one symbol.

A WTRU may determine a PSFCH resource for an Option 2 groupcast transmission, for example, based on an ACK/

NACK. In an example, a WTRU may determine a PSFCH resource for an Option 2 groupcast transmission based on, for example, one or more of an ACK (e.g., transmitted in a PSFCH transmission), a NACK (e.g., transmitted in a PSFCH transmission), and/or a number of HARQ ACK/NACK bits.

An RX WTRU may determine a PSFCH resource from a set of groupcast PSFCH resources. A set of groupcast PSFCH resources may be associated with a groupcast PSSCH transmission. An RX WTRU may determine a PSFCH resource based on, for example, a combination of a WTRU L1 ID and one or more of the following. A RX WTRU may determine a PSFCH resource based on, for example, a WTRU TX-RX distance. A WTRU TX-RX distance may be a distance between a TX WTRU and an RX WTRU. A WTRU TX-RX distance may be determined by a RX WTRU based on, for example, the geographic information carried in a TX WTRU PSCCH/PSSCH transmission. A RX WTRU may determine a TX-RX distance based on, for example, TX WTRU geographical information (e.g., geographical coordinates or ZoneID) received in an SCI associated with the received PSSCH transmission. A RX WTRU may determine a TX-RX distance based on, for example, a RX WTRU's own equivalent geographical information. A RX WTRU may determine a PSFCH resource based on, for example, a minimum communication range requirement. A minimum communication range requirement may be a distance within which one or more groupcast transmission QoS requirements are satisfied. A minimum communication range (e.g., requirement) may be indicated in an SCI associated with a PSSCH transmission received by a RX WTRU. A RX WTRU may determine a PSFCH resource based on, for example, a reference signal received power (RSRP). An RSRP may include a PSCCH RSRP and/or a PSSCH RSRP. An RSRP may be measured, for example, by an RX WTRU. An RX WTRU may determine a PSFCH resource based on, for example, a ZoneID. A ZoneID may include an identity of a geographical zone that an RX WTRU is located in. An RX WTRU may derive a ZoneID based on, for example, a zone configuration from one or more higher layers. An RX WTRU may determine a PSFCH resource based on, for example, a PSFCH power. A PSFCH power may include a PSFCH power level based on, for example, a PSFCH power control. An RX WTRU may determine a PSFCH resource based on, for example, a path loss. A path loss may include a path loss between a TX WTRU and an RX WTRU. An RX WTRU may determine a path loss based on, for example, the PSCCH/PSSCH RSRP and/or a PSCCH/PSSCH transmit power, which may be indicted, for example, in the SCI associated with the received PSSCH transmission. An RX WTRU may determine a PSFCH resource based on, for example, HARQ information. HARQ information may include, for example, an ACK or a NACK, e.g., transmitted in a PSFCH and/or a number of HARQ ACK/NACK bits.

A WTRU L1 ID may be a WTRU L1 source/destination ID based on, for example, an L2 WTRU ID or a randomly assigned L1 WTRU ID. An L2 WTRU ID may be unique to each WTRU. An L1 WTRU ID using a part of an L2 WTRU ID (e.g., 8 LSBs) may lead to a collision. A WTRU L1 ID used to determine a PSFCH resource in a groupcast transmission may cause PSFCH resource overlapping. PSFCH resource overlapping may occur, for example, if a WTRU L1 ID is randomly assigned.

A WTRU may determine a PSFCH resource based on, for example, a WTRU L1 ID and a WTRU TX-RX distance. For example, a PSFCH resource may be associated with a specific WTRU TX-RX distance range. An RX WTRU may (e.g., first) select one or more (e.g., all) PSFCH resources associated with a TX-RX distance and may (e.g., subsequently) determine a PSFCH resource among the selected PSFCH resources based on, for example, the WTRU L1 ID. For example, a PSFCH frequency resource, e.g., an RB index, may include a modular function. A modular function may be based on a WTRU L1 ID and a number of (e.g., the total number of all) PSFCH resources associated with the TX-RX distance. PSFCH resource overlapping (e.g., caused by WTRU L1 ID collision) may be reduced, for example, by using a modular function based on the WTRU L1 ID and the number of PSFCH resources associated with the TX-RX distance. In examples, a RX WTRU may be (pre)configured with a hash function. A hash function may be based on, for example, a WTRU L1 ID and a TX-RX distance.

A WTRU may determine a PSFCH resource based on, for example, a WTRU TX-RX distance, a minimum communication range requirement, and/or a WTRU L1 ID. For example, a PSFCH resource may be associated with a ratio of a WTRU TX-RX distance to a minimum communication range requirement. A plurality of PSFCH resources may be associated with RX WTRUs within a distance relative to a minimum communication range (e.g., requirement). An RX WTRU may select a PSFCH resource based on, for example, the RX WTRU's WTRU L1 ID. In examples, an RX WTRU may be (pre)configured with a hash function. A hash function may be based on, for example, a WTRU L1 ID and a ratio of a WTRU TX-RX distance to a received minimum communication range (e.g., requirement).

A WTRU may determine a PSFCH resource using a hash function based on, for example, a WTRU source ID and one or more of, for example, an RSRP, a ZoneID, a PSFCH power level, a path loss, and/or HARQ information.

A WTRU may determine a PSFCH time and frequency resource. A WTRU may determine a PSFCH resource and may use the PSFCH resource to feed back a HARQ status of a (e.g., one) PSSCH/PSCCH (e.g., one PSSCH/PSCCH transmission). A WTRU may determine a PSFCH resource, for example, based on one or more of the following. A WTRU may determine a PSFCH resource based on, for example, a time and frequency index of the PSSCH/PSCCH. A WTRU may determine a PSFCH resource based on, for example, a cast type (e.g., unicast or groupcast). A WTRU may determine a PSFCH resource based on, for example, a HARQ feedback type for groupcast (e.g., NACK based feedback or ACK/NACK based feedback). A WTRU may determine a PSFCH resource based on, for example, a PSFCH hopping pattern. For example, a WTRU may be configured with a hopping pattern of a PSFCH frequency resource. For example, a frequency location of a PSFCH resource associated with a PSSCH/PSCCH may be hopped from a first slot having the PSFCH resource to a second slot having the PSFCH resource. A WTRU may determine a PSFCH resource based on, for example, a first and/or a last subchannel/RB of PSFCH resources in a resource pool. A WTRU may determine a PSFCH resource based on, for example, a duration and/or bandwidth of a PSSCH/PSCCH transmission.

Figure 4:
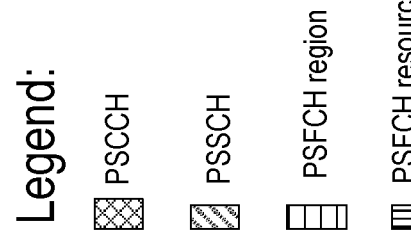
FIG. 4 shows an example PSFCH to PSSCH/PSCCH mapping based on a cast type and/or a HARQ.
Figure 4:
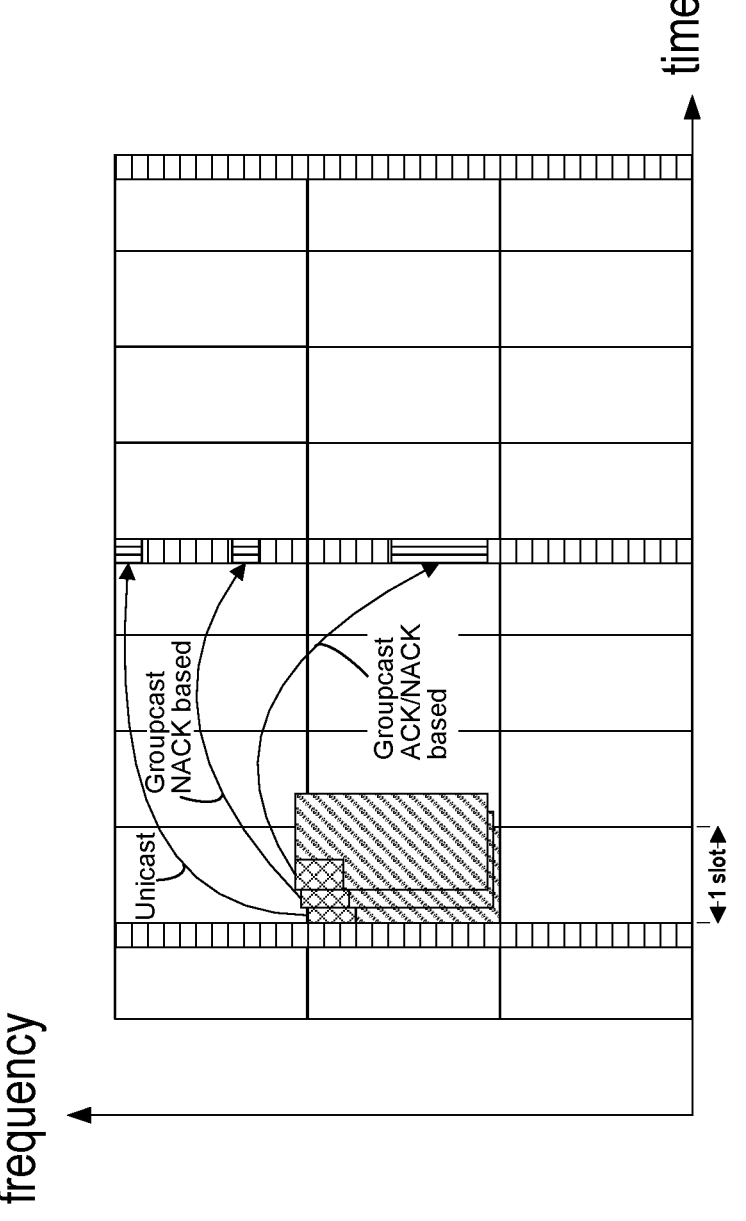

FIG. 4 depicts an example PSFCH to PSSCH/PSCCH mapping based on a cast type and a HARQ based option. A WTRU may determine a PSFCH resource for a PSSCH/PSCCH transmission based on, for example, a cast type and/or a HARQ feedback option used for the PSSCH/PSCCH transmission. For example, a WTRU may be (pre-)configured with one or more of the following mappings between a time and frequency index of a PSSCH/PSCCH and the associated PSFCH resource in a resource pool. A WTRU may be (pre-)configured with the time and frequency index of a PSSCH/PSCCH and a PSFCH resource mapping for a unicast transmission. A WTRU may be (pre-)configured with a PSFCH resource and a time and frequency index of a PSSCH/PSCCH mapping for a NACK based HARQ feedback groupcast transmission. A WTRU may be (pre-)configured with a PSFCH resource and a time and frequency index of a PSSCH/PSCCH mapping for an ACK/NACK based HARQ feedback groupcast transmission.

A WTRU (e.g., after decoding a PSSCH/PSCCH) may determine a PSFCH resource for the associated PSSCH/PSCCH, for example, according to the (pre-)configured mapping. In an example (e.g., as illustrated in FIG. 4), a WTRU may determine a PSFCH resource for a PSSCH/PSCCH based on, for example, the cast type and HARQ feedback option, for example, if the PSSCH/PSCCH is groupcast.

In examples, a WTRU may determine a PSFCH resource for a PSSCH/PSCCH transmission based on, for example, a data QoS. A WTRU (e.g., after decoding the PSCCH/PSSCH) may determine a PSFCH resource for the associated PSCCH/PSSCH, for example, according to a (pre-)configured mapping. For example, a WTRU may determine a PSFCH resource at a lowest frequency location in a resource pool and with a largest number of PSFCH resources for data, for example, associated with a priority that is higher than a threshold (e.g., a preconfigured and/or predetermined priority threshold).

In examples, a WTRU may determine a frequency size of a PSFCH resource, for example, based on a size of an associated PSSCH/PSCCH resource. For example, a WTRU may be (pre-)configured, in a resource pool, with a mapping between a time and frequency index of a PSSCH/PSCCH resource and a PSFCH resource, which may include one or more RBs. A WTRU may (e.g., then) determine a size (e.g., the frequency size) of the PSFCH resource to use for the feedback of the associated PSSCH/PSCCH resource based on, for example, a number of subchannels used for the PSSCH/PSCCH transmission. A PSFCH resource may include one RB, for example, if the PSSCH/PSCCH resource occupies one subchannel. A WTRU may determine that a corresponding PSFCH transmission occupies two RBs (e.g., the PSFCH resource may include two RBs), for example, if the PSSCH/PSCCH resource occupies two sub-channels.

Figure 5:
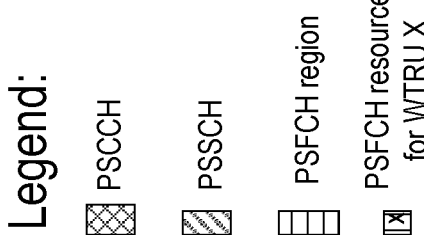
FIG. 5 shows an example WTRU determination of a PSFCH resource in an ACK/NACK based feedback groupcast.
Figure 5:
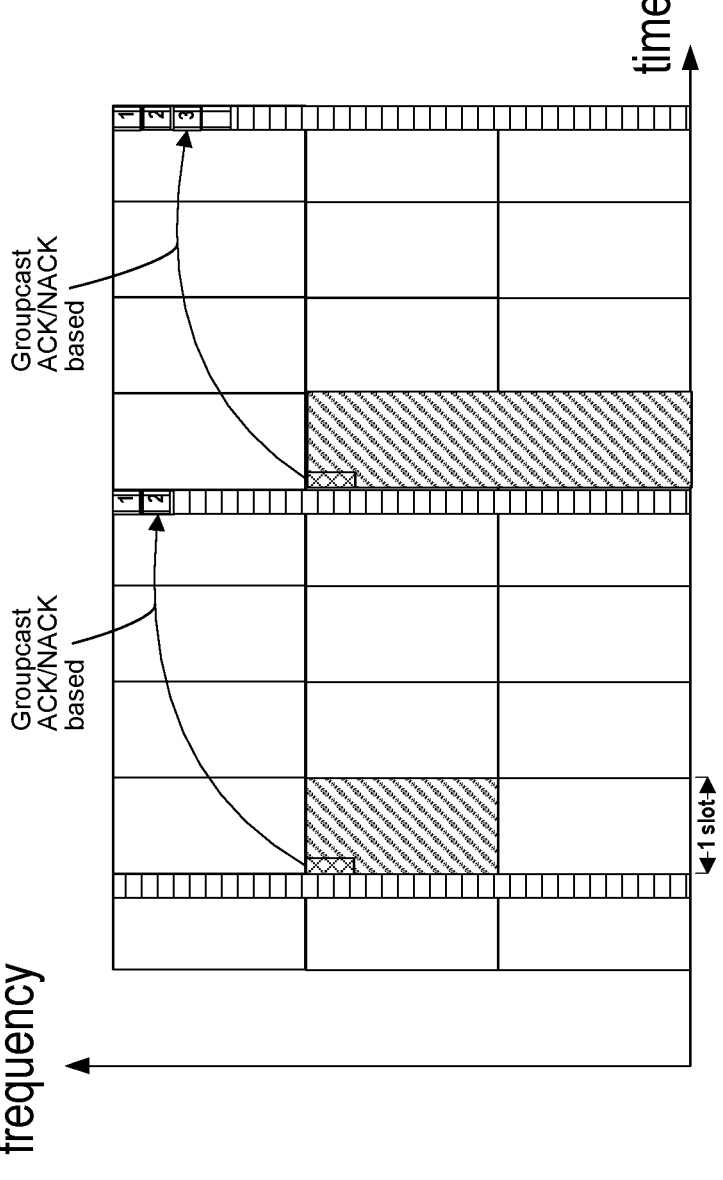

FIG. 5 depicts an example WTRU determination of a PSFCH resource in an ACK/NACK based feedback groupcast. A WTRU may determine a PSFCH resource for an associated PSSCH/PSCCH of an ACK/NACK based feedback groupcast, for example, based on one or more of the following. A WTRU may determine a PSFCH resource for the associated PSSCH/PSCCH of the ACK/NACK based feedback groupcast based on, for example, an ID (e.g., one ID) of the WTRU. In examples, a WTRU may use the WTRU's ID within a group to determine the WTRU's order in the group and select a PSFCH resource in the set of PSFCH resources for the group. In examples, a group leader may use, for example, one of the WTRU's IDs (e.g., L1, L2, or upper layer ID) to inform the WTRU's order in the group, e.g., in a PSFCH resource determination. A WTRU's order in the group may be conveyed to the WTRU, for example, by PC5-RRC. A WTRU may determine a PSFCH resource for the associated PSSCH/PSCCH of the ACK/NACK based feedback groupcast based on, for example, a size of the PSFCH resource for the group. A WTRU may determine the PSFCH resource for the associated PSSCH/PSCCH of the ACK/NACK based feedback groupcast based on, for example, a number of WTRUs within the group.

A WTRU may determine a PSFCH resource, for example, following a time order, a frequency order, and/or a code order.

In examples, (e.g., as shown in FIG. 5) a group of three (3) Rx WTRUs may transmit an ACK/NACK PSFCH for each PSSCH/PSCCH transmission. An (e.g., each) sub-channel resource for PSSCH/PSCCH may be mapped to two (2) PRBs, for example, to transmit ACK or NACK status. For example, an (e.g., each) RB may be used by a (e.g., one) WTRU for a (e.g., one) PSFCH transmission. A first WTRU and a second WTRU may feedback the HARQ status, for example, for PSSCH/PSCCH transmission in one sub-channel. One or more WTRUs (e.g., all WTRUs) may feedback the HARQ status of the PSSCH/PSCCH, for example, for PSSCH/PSCCH transmission in two or more sub-channels.

Figure 6:
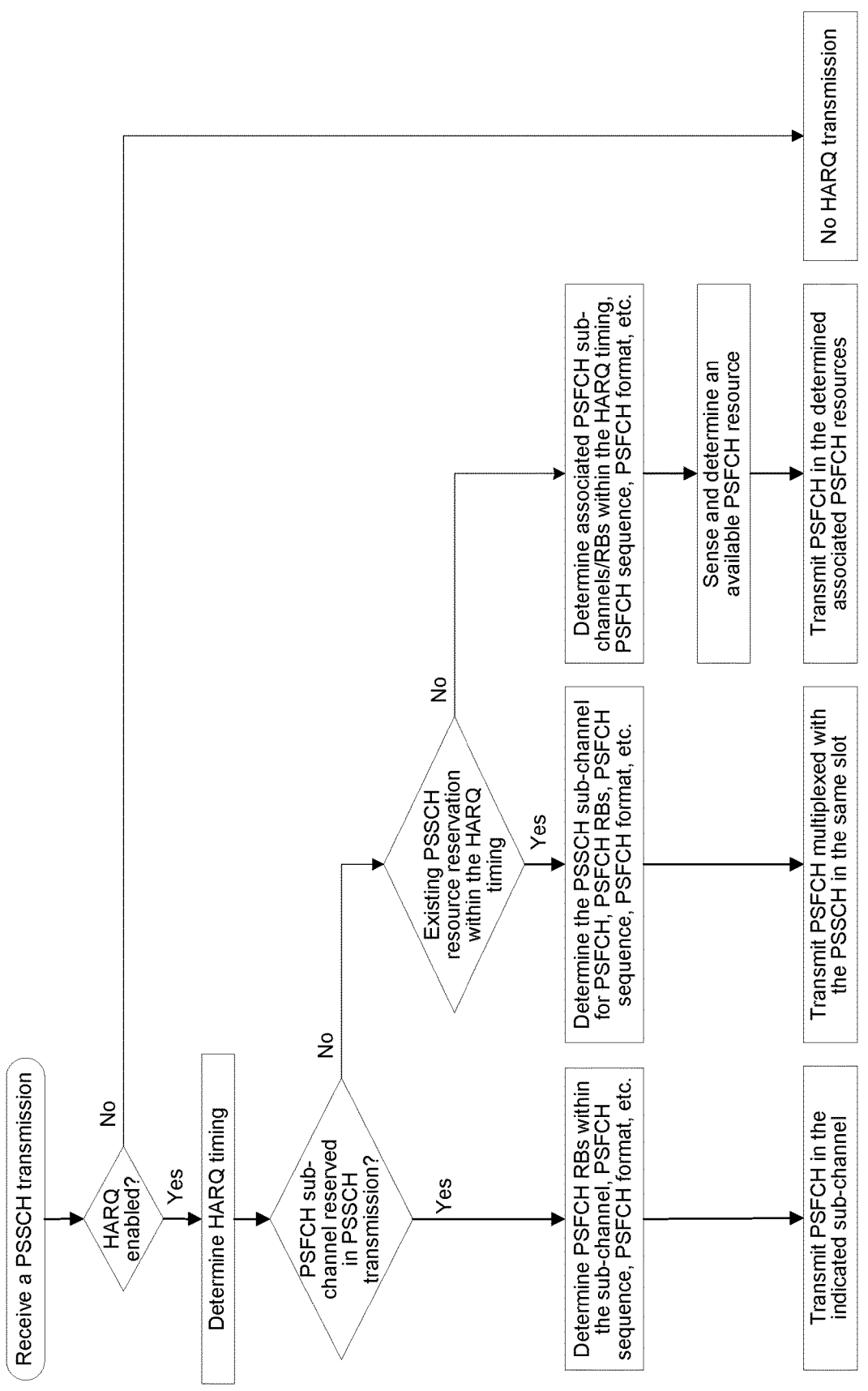
FIG. 6 shows an example of a WTRU PSFCH resource determination and transmission for HARQ that may use a shared resource pool.

A WTRU may transmit a PSFCH. A WTRU may transmit a PSFCH in one or more (e.g., determined) PSFCH resources, for example, using a shared PSFCH resource pool (e.g., as shown in FIG. 6). FIG. 6 shows an example of a WTRU PSFCH resource determination and transmission for a HARQ, which may use a shared resource pool.

Figure 7:
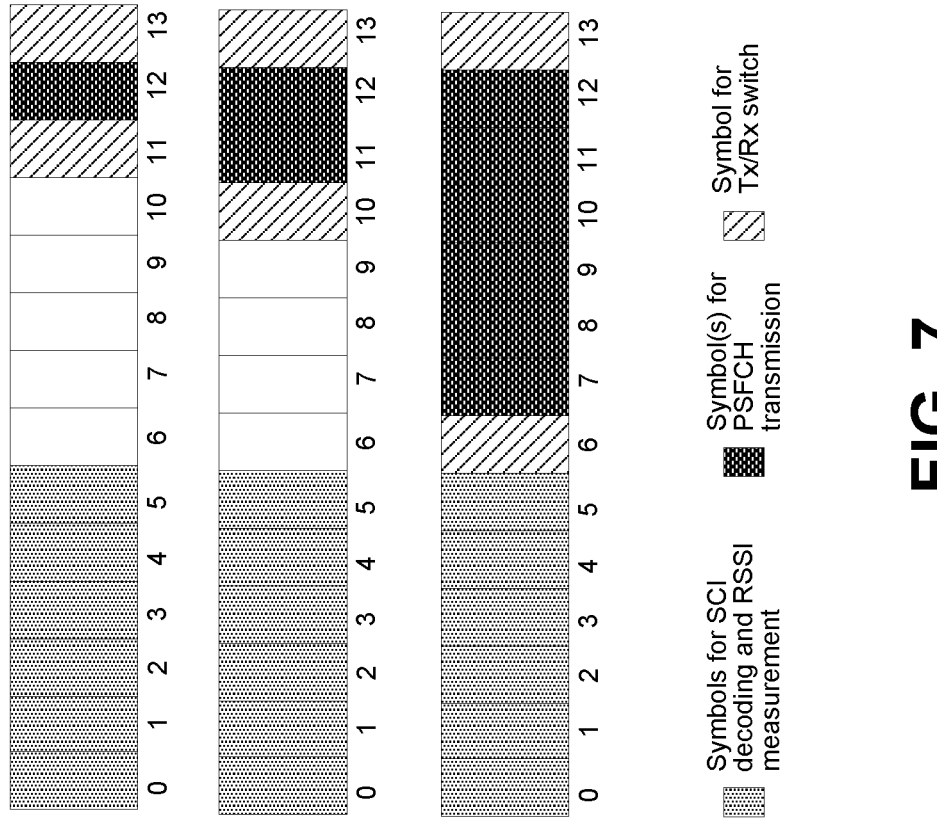
FIG. 7 shows examples of WTRU PSFCH sensing and transmission for PSFCHs occupying 1, 2, and 6 symbols.

A WTRU may perform PSFCH sensing and transmission. A WTRU may perform PSFCH sensing and transmission in the determined PSFCH sub-channels within the HARQ timing (e.g., as shown in FIG. 7). FIG. 7 shows examples of WTRU PSFCH sensing and transmission, for example, for PSFCH occupying 1, 2, and 6 symbols.

PSFCH sensing and transmission may include, for example, one or more of the following. A WTRU may (e.g., in a slot of the determined HARQ timing) measure a received power (e.g., RSSI) in a sub-channel over a number of CP-OFDM symbols in the beginning of the slot (e.g., the first slot) of the HARQ timing. In an example, as shown in FIG. 7, the symbols may be symbols 0-5.

A WTRU may transmit the PSFCH in a sub-channel, for example, if the received power is below a (pre-)configured threshold. The WTRU may decode the SCI and obtain a slot format and/or PSFCH information, for example, if the received power is not below the threshold.

A WTRU may determine whether there is a PSFCH transmission multiplexed with a PSSCH in a slot based on, for example, a PSFCH presence indicator and/or a slot format indicator in the SCI. A WTRU may transmit a PSFCH, for example, if the PSFCH presence is detected (e.g., the PSFCH transmission does not overlap with the PSSCH part of the slot). The WTRU may evaluate the next sub-channel selected for PSFCH transmission, for example, if a PSFCH presence is not detected.

A WTRU may process the next slot (e.g., if the HARQ timing includes more than one slot), for example, if one or more (e.g., all) sub-channels selected for PSFCH transmission at the slot are occupied by a PSSCH.

WTRU may (e.g., if no selected PSFCH sub-channels are available in the HARQ timing) apply an extended HARQ timing (e.g., provided the extended HARQ timing is within the QoS latency requirement) and switch to a dedicated PSFCH resource pool to select a PSFCH resource (e.g., as disclosed herein).

A WTRU may discard HARQ information, for example, if no extended HARQ timing is available for low-latency TB transmission. A WTRU may, for example, buffer HARQ ACK/NACK information, switch to Mode 1 transmission, and send the HARQ information in a PUCCH or PUSCH with WTRU PHY ID and/or Link ID information.

HARQ transmissions may be multiplexed to different source WTRUs. A WTRU may support multiple active unicast/multicast transmissions. A WTRU may (e.g., determine to) transmit more than one PSFCH in a slot carrying HARQ ACK/NACKs corresponding to PSSCHs received from different source WTRUs, for example, based on HARQ timing associated with each received TB transmission. The WTRU may multiplex PSFCHs to different source WTRUs based on, for example, one or more of CDM, FDM, and/or TDM.

A WTRU may multiplex PSFCHs to different source WTRUs, for example, based on CDM. A WTRU may (e.g., determine to) apply identical time and frequency resources (e.g., the same RB(s) at the same symbol in a slot) for one or more (e.g., all) PSFCH transmissions. A WTRU may determine a distinct HARQ ACK/NACK sequence (e.g., using the cyclic shift index) based on, for example, the Source ID or Link ID associated with a PSFCH (e.g., each PSFCH).

A WTRU may multiplex PSFCHs to different source WTRUs, for example, based on FDM. A WTRU may (e.g., determine to) transmit PSFCHs in different frequency allocations (e.g., sub-channels or RBs). A frequency allocation may be based on, for example, the Source ID or Link ID associated with a PSFCH (e.g., each PSFCH).

A WTRU may multiplex PSFCHs to different source WTRUs, for example, based on TDM. A WTRU may (e.g., determine to) transmit PSFCH at different symbols within a slot. The symbol location may be determined based on, for example, the Source ID or Link ID associated with a PSFCH (e.g., each PSFCH).

A WTRU may (e.g., determine to) adjust the slot of one or more PSFCH transmissions (e.g., each PSFCH transmission) and align them over multiple slots. A WTRU may perform TDM of PSFCH transmissions over multiple slots (e.g., provided that each PSFCH transmission meets an associated HARQ timing).

HARQ transmissions may be multiplexed to the same source WTRUs. A WTRU may support multiple active service applications with the same WTRU during a unicast transmission. A HARQ timing associated with TBs belonging to service applications of different QoS requirements (e.g., PDB) may overlap, for example, even when the associated PSSCH transmission is received at a different time. A WTRU may (e.g., determine to) transmit, for example, one PSFCH carrying HARQ ACK/NACKs for multiple TBs received from a source WTRU or multiple PSFCHs in one slot, where each of multiple PSFCHs may carry a HARQ ACK/NACK corresponding to a received TB.

A WTRU may (e.g., determine to) transmit one PSFCH carrying HARQ ACK/NACKs for multiple TBs received from a source WTRU. A WTRU may be (pre-)configured with multiplexing and/or bundling of the HARQ ACK/NACK information in a PSFCH transmission.

A WTRU may (e.g., determine to) transmit multiple PSFCHs in one slot, where each of the multiple PSFCHs may carry a HARQ ACK/NACK corresponding to a received TB. A WTRU may multiplex different PSFCHs to the same source WTRU based on, for example, one or more of CDM, FDM, and/or TDM.

A WTRU may multiplex the different PSFCHs to the same source WTRU, for example, based on CDM. A WTRU may (e.g., determine to) apply (e.g., identical) time and frequency resources (e.g., the same RB(s) at the same symbol in the slot) for one or more (e.g., all) PSFCH transmissions. A WTRU may determine a distinct HARQ ACK/NACK sequence (e.g., using the cyclic shift index)

based on, for example, the HARQ Process ID and/or Source ID associated with a PSFCH (e.g., each PSFCH).

A WTRU may multiplex the different PSFCHs to the same source WTRU, for example, based on FDM. A WTRU may (e.g., determine to) transmit PSFCHs in different frequency allocations (e.g., sub-channels or RBs). A frequency allocation may be based on, for example, the HARQ Process ID and/or Source ID associated with a PSFCH (e.g., each PSFCH).

A WTRU may multiplex different PSFCHs to the same source WTRU, for example, based on TDM. A WTRU may (e.g., determine to) transmit PSFCH at different symbols within a slot. A symbol location may be determined based on, for example, the HARQ Process ID and/or Source ID associated with a PSFCH (e.g., each PSFCH).

Priority handling of multiple PSFCHs within a slot may be performed. A WTRU may determine the power of a PSFCH transmission (e.g., each PSFCH transmission) independently based on, for example, the power control parameters of a PSFCH (e.g., each PSFCH). The parameters may vary, for example, depending on the QoS requirement of the data associated with the PSFCH transmission. A WTRU may ensure the power of a PSFCH associated with the highest QoS requirements, such as PPPP and PPPR, and may drop a PSFCH with lower QoS requirements, for example, if the total power of a transmission slot exceeds the configured limit.

A WTRU may monitor a PSFCH. A WTRU may monitor a HARQ transmission. A WTRU may monitor a HARQ transmission according to the HARQ timing associated with a PSSCH transmission, for example, using a shared PSFCH resource pool (e.g., as shown in FIG. 8).

Figure 8:
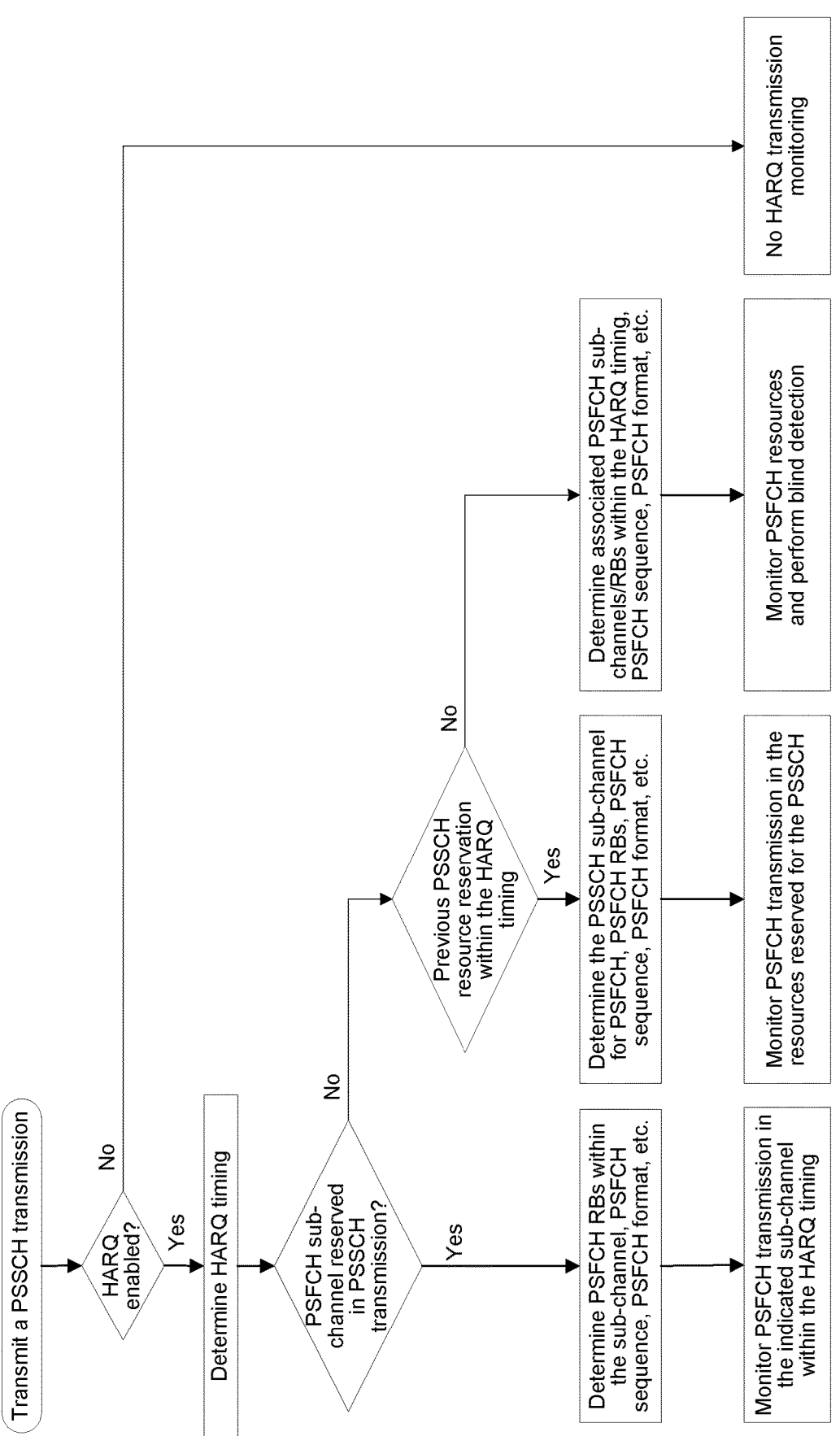
FIG. 8 shows an example of a WTRU PSFCH resource determination and monitoring for HARQ that may use a shared resource pool.

FIG. 8 shows an example of a WTRU PSFCH resource determination and monitoring for HARQ, which may use a shared resource pool. A WTRU may perform a blind detection at one or more (e.g., all) monitored PSFCH resources based on, for example, a HARQ ACK/NACK sequence for sequence-based PSFCH or a DM-RS configuration for a PSFCH carrying a payload. A WTRU may perform blind detection among the PSFCH frequency resource(s), e.g., sub-channel or RB, associated with a PSSCH. A WTRU may start blind detection, for example, from the sub-channel and RB associated with the WTRU's L1 Source ID. A WTRU may start AGC, for example, at the beginning of the PSFCH resource, which may include, for example, one or more consecutive symbols (e.g., immediately) before the Tx/Rx switch symbol at the end of a slot (e.g., as shown in the example in FIG. 2). A WTRU may not receive sensing information about a slot and may exclude the slot from sensing processing, for example, if (e.g., when) performing PSFCH detection in the slot.

A WTRU may not detect a transmission (e.g., neither HARQ ACK nor NACK transmissions) at the monitored HARQ timing, which may be referred to as a discontinuous transmission (DTX). A WTRU may perform re-transmission and extended monitoring, for example, if DTX is detected. A WTRU may detect DTX within an associated HARQ timing (e.g., no PSFCH detection), for example, for one or more of the following reasons. A WTRU may detect DTX within an associated HARQ timing, for example, if the associated PSCCH/PSSCH is received and a PSFCH is transmitted due to a PSFCH detection/decoding failure. A WTRU may detect DTX within an associated HARQ timing, for example, if the associated PSCCH/PSSCH is received and a PSFCH is not transmitted (e.g., due to Mode 2 resource acquisition failure, such as when using a shared PSFCH resource pool). A WTRU may detect DTX within an associated HARQ timing, for example, if the associated PSCCH/PSSCH is not received, e.g., due to a PSCCH detection/decoding failure.

A WTRU may determine that a DTX indicates a failure of the associated PSCCH decoding (e.g., when using a dedicated PSFCH resource pool). A WTRU may perform a re-transmission of a TB (e.g., using the system bits), for example, if the WTRU receives a DTX using a dedicated PSFCH resource pool.

A WTRU may (e.g., determine to) extend HARQ timing by a (pre-)configured time period (e.g., when using a shared PSFCH resource pool), for example, if the channel busy ratio (CBR) is higher than a (pre-) configured threshold and/or the extended HARQ timing is within a QoS latency requirement.

A WTRU may (e.g., be (pre-)configured to) switch to a dedicated PSFCH resource pool for a PSFCH transmission associated with an extended HARQ timing. Source and/or destination WTRUs may determine PSFCH resources in a dedicated PSFCH resource pool, e.g., as disclosed herein. A WTRU may regard a TB as being received correctly, for example, if a HARQ transmission is not received at the HARQ timing and extended HARQ timing. A WTRU may (e.g., subsequently) flush the HARQ data buffer. A WTRU may (e.g., be (pre-)configured to) switch to Mode 1 for the HARQ PSFCH transmission. A WTRU may maintain the data in the buffer until the TB delay budget is exceeded.

PSSCH/PSCCH transmission and reception may be performed in a PSFCH slot. A WTRU may determine whether the WTRU's PSSCH/PSCCH transmission collides with a PSFCH transmission. For example, a WTRU may perform sensing to determine whether one or more PSFCH transmissions collide with the WTRU's PSSCH/PSCCH transmission. A WTRU may be (e.g., explicitly) (pre-)configured with a mapping between a time and frequency index of a PSSCH/PSCCH and a PSFCH resource in a resource pool. A WTRU may determine whether there is a PSFCH transmission on the WTRU's PSSCH/PSCCH resource, for example, by monitoring (e.g., all) PSSCH/PSCCH having an associated PSFCH resource that overlaps with the WTRU's PSSCH/PSCCH resource for transmission. A WTRU may determine that the WTRU's PSSCH/PSCCH transmission may collide with one or more PSFCH transmissions, for example, if one or more of the following are satisfied.

A WTRU may determine that the WTRU's PSSCH/PSCCH transmission may collide with one or more PSFCH transmissions, for example, if the WTRU successfully decodes a PSCCH/PSSCH having an associated PSFCH that overlaps with the WTRU's PSSCH/PSCCH transmission. A WTRU may determine that the WTRU's PSSCH/PSCCH transmission may collide with one or multiple PSFCH transmissions, for example, if the RSRP/RSRQ/RSSI of the PSSCH/PSCCH is greater than a threshold. The threshold may be (pre-)configured.

A WTRU may perform rate matching/puncturing and/or may adjust the modulation and coding scheme (MCS) for a transmission. In an example, a WTRU may perform rate matching/puncturing and/or may adjust the MCS for a transmission, for example, if the WTRU detects a possible collision. A WTRU may perform rate matching/puncturing and/or may adjust the MCS for a transmission, for example, if the WTRU has to transmit PSSCH/PSCCH and transmit/receive a PSFCH in the same time slot. A WTRU may perform rate matching/puncturing and/or may adjust the MCS of a PSSCH/PSCCH, for example, if the WTRU needs to avoid a collision between the WTRU's PSSCH/PSCCH transmission and PSFCH transmission(s) from one or more other WTRUs. A WTRU may perform rate matching/puncturing and/or may adjust the MCS of a PSSCH/PSCCH, for example, if the WTRU has to transmit PSSCH/PSCCH and receive PSFCH in the same slot. A WTRU may use symbol(s) between the PSSCH/PSCCH and PSFCH symbols for a TX/RX switch and/or an AGC, for example, if the WTRU transmits a PSSCH/PSCCH in a PSFCH slot before a scheduled PSFCH reception. A PSSCH/PSCCH transmission duration may be reduced (e.g., by a symbol), for example, by using one or more symbols between the PSSCH/PSCCH and PSFCH symbols for the TX/RX switch and/or the AGC. A WTRU may perform rate matching/puncturing and/or may adjust the MCS of a PSSCH/PSCCH, for example, if the WTRU has to transmit PSSCH/PSCCH and PSFCH in the same slot. A WTRU may use one or more symbols between two transmissions for a gap period, e.g., for frequency re-tuning, for example, if the WTRU transmits a PSSCH/PSCCH in a PSFCH slot before a scheduled PSFCH transmission. A PSSCH/PSCCH transmission duration may be reduced, for example, by using one or more symbols between two transmissions for a gap period.

A WTRU may indicate (e.g., explicitly indicate) a rate matched/punctured resource in SCI, for example, to support the receiver WTRU in decoding the TB. The rate-matched/punctured symbol(s) of PSSCH/PSCCH (e.g., last P symbols of PSSCH/PSCCH) may be indicated, for example, in the associated SCI. P may have one or more candidate values. One or more of the values may be indicated in the SCI. A number of symbols used for PSSCH/PSCCH in a slot may be indicated, for example, in the associated SCI. A Rx WTRU may (e.g., be configured to) assume that symbols potentially overlapped with PSFCH resources are rate-matched and/or punctured. Rate matched and/or punctured symbol(s) may not be indicated in an associated SCI, for example, if the Rx WTRU assumes that the symbols overlapped with PSFCH resources are rate-matched and/or punctured.

A WTRU may determine whether it may indicate (e.g., explicitly) rate matching/puncturing information in the SCI (e.g., based on the WTRU ID and/or Link ID associated with the PSSCH/PSCCH and PSFCH), for example, if the WTRU transmits a PSSCH/PSCCH in a PSFCH slot before a scheduled PSFCH reception. A WTRU ID and/or Link ID associated with a PSFCH may be the ID of a PSSCH/PSCCH transmission corresponding to a HARQ ACK/NACK carried in the PSFCH. A WTRU may (e.g., determine to) not include rate matching/puncturing information in the SCI, for example, if the WTRU Destination ID associated with the PSSCH/PSCCH transmission and PSFCH reception are identical. The RX WTRU of the PSSCH/PSCCH transmission and TX WTRU of the PSFCH transmission may be the same WTRU, for example, if the IDs match. A WTRU may know (e.g., implicitly have the knowledge of) the rate matching/puncturing, for example, if the WTRU is the RX WTRU of the PSSCH/PSCCH transmission and the TX WTRU of the PSFCH transmission.

A WTRU may determine a transmission duration of a PSSCH/PSCCH in a slot having PSFCH resources based on, for example, a sub-channel index of the PSSCH/PSCCH and/or a set of subchannels dedicated to PSFCH in each slot. For example, a WTRU may be configured with two or more of a full slot PSSCH/PSCCH or a PSSCH/PSCCH that occupies N (e.g., N<14) first symbols. In an example, a WTRU may be configured with a PSSCH/PSCCH transmission occupying 11 first symbols, for example, to reserve remaining symbols in the slot for HARQ operation. A WTRU may (e.g., determine to), for example, transmit a full slot PSSCH/PSCCH in a subchannel index without a (pre-)configured PSFCH resource or may, for example, transmit a partial (e.g., non-full) slot PSSCH/PSCCH (e.g., N=11 symbols) in a sub-channel having at least one (pre-)configured PSFCH resource.

A WTRU may use symbol(s) between the PSSSH/PSCCH and PSFCH symbols for AGC re-convergence, for example, if the WTRU receives a PSSCH/PSCCH in a PSFCH slot before a scheduled PSFCH reception. An AGC re-convergence before the PSFCH may be performed, for example, if the PSSCH/PSCCH and PSFCH are from different WTRUs. An AGC re-convergence before the PSFCH may be performed, for example, if the PSSCH/PSCH and PSFCH have a frequency offset larger than a threshold.

A WTRU may determine whether AGC re-convergence may be required based on, for example, a Link ID and/or a WTRU ID. In an example, a WTRU may compare a WTRU Source ID decoded in the PSCCH in the beginning of the PSFCH slot with a Source ID associated with the PSFCH transmission. A WTRU may not use any symbols for AGC re-convergence, for example, if the Source IDs are identical (e.g., when the transmissions are from the same WTRU). A WTRU may use symbol(s) before PSFCH reception for AGC re-convergence, (e.g., based on the PSFCH frequency resource allocation), for example, if the Source IDs are different (e.g., when the transmissions are from different WTRUs). A WTRU may puncture a received PSSCH/PSCCH transmission with the symbol(s) used for AGC re-convergence.

A WTRU may (e.g., determine to) perform AGC re-convergence, for example, based on a PSSCH frequency allocation decoded in an SCI in a beginning of a PSFCH slot and/or a PSFCH frequency allocation. A PSFCH frequency allocation may be determined, for example, based on an association with a corresponding PSSCH/PSCCH transmission. A WTRU may (e.g., determine to) perform AGC re-convergence, for example, if a difference between PSSCH and PSFCH frequency allocations exceed a threshold. A WTRU may puncture a received PSSCH/PSCCH, for example, if the WTRU determines to and/or does perform AGC re-convergence.

A WTRU may manage one or more HARQ processes. For example, a WTRU may perform HARQ process management. HARQ process management may include, for example, flushing a HARQ buffer and/or determining which HARQ process to release.

A WTRU may (e.g., determine to) flush a HARQ buffer. A WTRU may (e.g., determine to) flush a HARQ buffer based on, for example, a (pre-)configured period. For example, a WTRU may release a HARQ process following a (pre-)configured period. A WTRU may determine which HARQ process to release based on, for example, one or more of the following. A WTRU may determine which HARQ process to release based on, for example, a QoS of the receiving TB. For example, a WTRU may (e.g., determine to) release a HARQ process of a TB based on, for example, a priority indicated in SCI of the TB. A WTRU may be configured with a mapping between a priority and a period, for example, to keep a TB in the buffer (e.g., when the TB has not been decoded successfully). A WTRU may release a HARQ process (e.g., after the configured period), for example, even if the WTRU is not able to (e.g., successfully) decode the TB. A WTRU may determine which HARQ process to release based on, for example, a cast type and/or groupcast HARQ feedback option. In an example, a WTRU may be configured with different periods, for example, to keep a TB in the HARQ buffer for a (e.g., each) cast type and/or for a (e.g., each) HARQ feedback option (e.g., a NACK based feedback or an ACK/NACK based feedback). A WTRU may determine which HARQ process to release based on, for example, an availability of a reserved resource for the same TB in the SCI. In an example, a WTRU may (e.g., determine to) release a HARQ process, for example, if the SCI indicates there is no resource reservation for the same TB. A WTRU may determine which HARQ process to release based on, for example, a HARQ feedback enabling/disabling indication in the SCI. In an example, a WTRU may release a HARQ buffer, for example, if the WTRU receives a HARQ feedback disabling indication in the SCI for a previous transmission and/or a HARQ feedback enabling indication for the previous transmission of the same TB.

A WTRU may release a HARQ process (e.g., a low priority HARQ process), for example, if the WTRU receives a high priority transmission and/or the WTRU does not have remaining HARQ transmissions/receptions for the HARQ process. A (e.g., each) HARQ process may be assigned a priority. A high priority transmission may have a higher priority than the released HARQ process (e.g., a low priority HARQ process). For example, a WTRU may (e.g., determine to) release a HARQ process to receive another TB. A WTRU may determine which HARQ process to release based on, for example, one or more of the following. A WTRU may determine which HARQ process to release based on, for example, a QoS of a TB stored in the HARQ process. For example, a WTRU may (e.g., determine to) release a HARQ process associated with a lowest priority TB. A WTRU may determine which HARQ process to release based on, for example, a TB size. In an example, a WTRU may (e.g., determine to) release a HARQ process associated with a largest or smallest TB. A WTRU may determine which HARQ process to release based on, for example, a cast type of a HARQ process. A WTRU may (e.g., determine to) release a HARQ process associated with a cast type, e.g., unicast, groupcast, or broadcast. In an example, a WTRU may (e.g., determine to) release a HARQ process associated with a broadcast TB, for example, if the WTRU may be (e.g., is) able to decode another blind retransmission of the released TB. A WTRU may determine which HARQ process to release based on, for example, a HARQ transmission order of a TB. A HARQ transmission order may include two or more HARQ processes. A HARQ transmission order may indicate a transmission order for the two or more HARQ processes. In an example, a WTRU may (e.g., determine to) release a HARQ process associated with the highest or lowest HARQ process in a HARQ transmission order.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising:
a processor configured to:
    receive an allocation of physical sidelink feedback channel (PSFCH) resources;
    receive a sidelink control information (SCI) associated with a physical sidelink shared channel (PSSCH) transmission;
    determine a set of PSFCH resources within the allocation of PSFCH resources;
    select a PSFCH resource within the set of PSFCH resources, wherein the PSFCH resource is one resource block, wherein the selection of the PSFCH resource is based at least on an L1 Source identifier (ID) indicated in the SCI and a cast type indicated in the SCI, and wherein, when the cast type is groupcast, the selection of the PSFCH resource is further based on a WTRU ID; and
    send a transmission via the selected PSFCH resource.

2. The WTRU of claim 1, wherein the selection is further based on slot information.

3. The WTRU of claim 1, wherein the processor is further configured to send HARQ acknowledgment/negative acknowledgment (ACK/NACK) information associated with the PSSCH transmission on the selected PSFCH resource.

4. The WTRU of claim 1, wherein the set of PSFCH resources within the allocation of PSFCH resources is determined based on a lowest PSSCH sub-channel index and PSSCH slot number.

5. The WTRU of claim 1, wherein, for the received PSFCH resources, there is a mapping between each sub-channel in a PSSCH resource pool and one PSFCH resource in the allocation of PSFCH resources.

6. The WTRU of claim 1, wherein the received PSFCH resources comprise unicast and groupcast resources, and wherein the determination of the set of PSFCH resources within the allocation of PSFCH resources is based on the cast type.

7. The WTRU of claim 1, wherein the selection is further based on a group member ID.

8. A method comprising:
receiving an allocation of physical sidelink feedback channel (PSFCH) resources;
receiving a sidelink control information (SCI) associated with a physical sidelink shared channel (PSSCH) transmission;
determining a set of PSFCH resources within the allocation of PSFCH resources;
selecting a PSFCH resource within the set of PSFCH resources, wherein the PSFCH resource is one resource block, wherein the selection of the PSFCH resource is based at least on an L1 Source identifier (ID) indicated in the SCI and a cast type indicated in the SCI, and wherein, when the cast type is groupcast, the selection of the PSFCH resource is further based on a wireless transmit/receive unit (WTRU) ID; and
sending a transmission via the selected PSFCH resource.

9. The method of claim 8, wherein the selection is further based on slot information.

10. The method of claim 8, further comprising sending HARQ acknowledgment/negative acknowledgment (ACK/NACK) information associated with the PSSCH transmission on the selected PSFCH resource.

11. The method of claim 8, wherein the set of PSFCH resources within the allocation of PSFCH resources is determined based on a lowest PSSCH sub-channel index and PSSCH slot number.

12. The method of claim 8, wherein, for the received PSFCH resources, there is a mapping between each sub-channel in a PSSCH resource pool and one PSFCH resource in the allocation of PSFCH resources.

13. The method of claim 8, wherein the received PSFCH resources comprise unicast and groupcast resources, and wherein the determination of the set of PSFCH resources within the allocation of PSFCH resources is based on the cast type.

* * * * *